(12) United States Patent
Smith

(10) Patent No.: US 8,182,906 B2
(45) Date of Patent: *May 22, 2012

(54) MULTILAYER CLEAR OVER COLOR POLYOLEFIN SHEETS AND LAYERED BACKING STRUCTURE

(75) Inventor: Dennis C. Smith, Norwalk, OH (US)

(73) Assignee: A. Schulman, Inc., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,270

(22) Filed: Aug. 26, 2011

(65) Prior Publication Data

US 2012/0064317 A1    Mar. 15, 2012

Related U.S. Application Data

(63) Continuation of application No. 12/548,946, filed on Aug. 27, 2009, now Pat. No. 8,007,902, which is a continuation of application No. PCT/US2009/042704, filed on May 4, 2009.

(60) Provisional application No. 61/050,465, filed on May 5, 2008.

(51) Int. Cl.
| | |
|---|---|
| *B32B 7/02* | (2006.01) |
| *B32B 38/00* | (2006.01) |
| *B32B 27/08* | (2006.01) |
| *B32B 5/00* | (2006.01) |
| *B29C 47/06* | (2006.01) |

(52) U.S. Cl. ........ 428/215; 428/516; 428/332; 156/196; 264/173.19

(58) Field of Classification Search .................. 428/215, 428/516, 332; 264/173.19; 156/196
See application file for complete search history.

(56) References Cited

U.S. PATENT DOCUMENTS

| | | | |
|---|---|---|---|
| 5,071,686 A | | 12/1991 | Genske et al. |
| 5,208,081 A | * | 5/1993 | Gubitz et al. ................... 428/31 |
| 5,302,463 A | | 4/1994 | Murata et al. |
| 5,310,584 A | | 5/1994 | Jacoby et al. |

(Continued)

FOREIGN PATENT DOCUMENTS

DE    42 10 969 A1    10/1993

(Continued)

OTHER PUBLICATIONS

EPO: Communication pursuant to Article 94(3) EPC, Application No. 09 711 523.2-2124, dated Feb. 28, 2011 (6 pages).

(Continued)

*Primary Examiner* — David R Sample
*Assistant Examiner* — Tahseen N Khan
(74) *Attorney, Agent, or Firm* — Medley, Behrens & Lewis, LLC; Nathan T. Lewis

(57) ABSTRACT

A multilayer structure includes a clear polyolefin layer, a colored polyolefin layer, and a random polyolefin backing layer. The colored and backing layers are coextruded and are permanently bonded at a layer interface, which is exclusive of an adhesive. The structure has a DOI of 70 or greater and passes a gravelometer impact test per the GM9508P standard, with a 10 pint load, at a −30° C. temperature, and at an impact angle of 30 degrees. Among other uses, the structures are appropriate for use as body panels in the motor vehicle industry. The structures display a "class A" finish and meet a variety of requirements for durability and weatherability. An ABA structured backing layer and a method of making it are also described herein.

116 Claims, 3 Drawing Sheets

U.S. PATENT DOCUMENTS

| | | | |
|---|---|---|---|
| 5,316,861 | A | 5/1994 | Marchal et al. |
| 5,560,885 | A | 10/1996 | Murschall et al. |
| 5,743,986 | A | 4/1998 | Colombo |
| 5,750,234 | A | 5/1998 | Johnson et al. |
| 5,972,520 | A | 10/1999 | Howell |
| 6,110,547 | A | 8/2000 | Sano et al. |
| 6,150,026 | A | 11/2000 | Furuya et al. |
| 6,261,674 | B1 | 7/2001 | Branham et al. |
| 6,268,064 | B1 | 7/2001 | Kim |
| 6,548,628 | B2 | 4/2003 | Winter et al. |
| 6,579,584 | B1 | 6/2003 | Compton |
| 6,579,601 | B2 | 6/2003 | Kollaja et al. |
| 6,617,008 | B1 | 9/2003 | Kono et al. |
| 6,620,474 | B1 | 9/2003 | Regnier et al. |
| 6,620,974 | B2 | 9/2003 | Fulmer et al. |
| 6,713,165 | B1 | 3/2004 | Karsten |
| 6,733,870 | B2 | 5/2004 | Young et al. |
| 6,811,867 | B1 | 11/2004 | McGurran et al. |
| 6,811,869 | B2 | 11/2004 | Luhmann et al. |
| 6,946,203 | B1 | 9/2005 | Lockhart et al. |
| 6,998,084 | B2 | 2/2006 | Horansky |
| 7,144,612 | B2 | 12/2006 | LaFave et al. |
| 7,329,468 | B2 | 2/2008 | Anderson et al. |
| 2002/0009594 | A1 | 1/2002 | Smith et al. |
| 2002/0009598 | A1 | 1/2002 | Lafave et al. |
| 2002/0055006 | A1 | 5/2002 | Vogel et al. |
| 2002/0157772 | A1 | 10/2002 | Enlow et al. |
| 2003/0011174 | A1 | 1/2003 | Merrifield et al. |
| 2003/0021981 | A1 | 1/2003 | Lu et al. |
| 2003/0134106 | A1 | 7/2003 | Ramesh et al. |
| 2003/0170460 | A1 | 9/2003 | Sienkiewicz et al. |
| 2003/0211298 | A1 | 11/2003 | Migliorini et al. |
| 2005/0074622 | A1 | 4/2005 | Vogel et al. |
| 2005/0074623 | A1 * | 4/2005 | Vogel .................... 428/520 |
| 2005/0077649 | A1 | 4/2005 | Valentage et al. |
| 2005/0106386 | A1 | 5/2005 | Vogel et al. |
| 2005/0147812 | A1 | 7/2005 | Malfait et al. |
| 2005/0158567 | A1 | 7/2005 | Carper et al. |
| 2005/0196630 | A1 | 9/2005 | Carper et al. |
| 2005/0202198 | A1 | 9/2005 | Hogan et al. |
| 2006/0177616 | A1 | 8/2006 | Barber et al. |
| 2006/0251913 | A1 | 11/2006 | Albe |
| 2007/0065614 | A1 | 3/2007 | Schulthess |
| 2007/0225431 | A1 * | 9/2007 | Mori et al. ................ 524/584 |

FOREIGN PATENT DOCUMENTS

| | | |
|---|---|---|
| DE | 195 47 720 A1 | 6/1997 |
| EP | 0 230 114 B1 | 12/1990 |
| EP | 0438532 B1 | 3/1993 |
| EP | 0510936 B1 | 9/1995 |
| EP | 0630746 B1 | 7/1997 |
| EP | 0 582 249 B1 | 11/1997 |
| EP | 0582249 B1 | 11/1997 |
| EP | 0563796 B1 | 1/1998 |
| EP | 0 589 033 B1 | 3/1998 |
| EP | 0668142 B1 | 7/1999 |
| EP | 0827526 B1 | 8/1999 |
| EP | 0727299 B1 | 10/1999 |
| EP | 0 636 473 B1 | 12/1999 |
| EP | 0635360 B1 | 12/1999 |
| EP | 0794859 B1 | 7/2000 |
| EP | 1 126 000 A1 | 8/2001 |
| EP | 0868995 B1 | 9/2001 |
| EP | 0764506 B1 | 1/2002 |
| EP | 0963285 B1 | 4/2002 |
| EP | 0 991 514 B1 | 8/2002 |
| EP | 1247855 A2 | 10/2002 |
| EP | 0864417 B1 | 11/2002 |
| EP | 0 761 315 B1 | 7/2003 |
| EP | 1340615 A2 | 9/2003 |
| EP | 1 230 300 B1 | 7/2004 |
| EP | 1171298 B1 | 8/2004 |
| EP | 1 120 244 B1 | 9/2004 |
| EP | 1200259 B1 | 10/2004 |
| EP | 1059478 B1 | 12/2004 |
| EP | 1274571 B1 | 7/2005 |
| EP | 0873862 B1 | 10/2005 |
| EP | 1075933 B1 | 10/2005 |
| EP | 1474292 B1 | 12/2005 |
| EP | 1 637 319 A1 | 3/2006 |
| EP | 1492851 B1 | 5/2006 |
| EP | 1157798 B1 | 6/2006 |
| EP | 1518761 B1 | 8/2006 |
| EP | 1719808 A2 | 11/2006 |
| EP | 1190008 B1 | 1/2007 |
| EP | 1257594 B1 | 2/2007 |
| EP | 0893247 B1 | 4/2007 |
| EP | 1775169 A1 | 4/2007 |
| EP | 1425359 B1 | 6/2007 |
| EP | 1425361 B1 | 9/2007 |
| EP | 1196482 B1 | 1/2008 |
| FR | 2740385 A1 | 4/1997 |
| FR | 2 801 530 A1 | 6/2001 |
| WO | 00/61062 | 10/2000 |
| WO | 01/78981 A1 | 10/2001 |
| WO | 02/055295 A1 | 7/2002 |
| WO | 02/066249 A1 | 8/2002 |
| WO | 02/078953 A1 | 10/2002 |
| WO | 02/081233 A1 | 10/2002 |
| WO | 03/059616 A1 | 7/2003 |
| WO | WO 03059616 A1 * | 7/2003 |
| WO | 2004/060650 A1 | 7/2004 |
| WO | 2005/005144 A1 | 1/2005 |
| WO | 2005/005267 A2 | 1/2005 |
| WO | 2005/035244 A1 | 4/2005 |
| WO | 2005/035246 A1 | 4/2005 |
| WO | 2005/044560 A1 | 5/2005 |
| WO | 2005/090071 A1 | 9/2005 |
| WO | 2005/103141 A1 | 11/2005 |
| WO | WO 2005103141 A1 * | 11/2005 |
| WO | 2005/118287 A1 | 12/2005 |
| WO | 2006/015201 A2 | 2/2006 |
| WO | 2006/116472 A2 | 11/2006 |
| WO | 2006/119588 A1 | 11/2006 |
| WO | 2006/128647 A1 | 12/2006 |
| WO | 2007/033117 A1 | 3/2007 |
| WO | 2007/057525 A1 | 5/2007 |
| WO | 2007/078526 A2 | 7/2007 |
| WO | 2007/135342 A1 | 11/2007 |

OTHER PUBLICATIONS

Brosius, Dale, "Inside Manufacturing: Thermoplastic Composites Lighten Transit Bus", Composites Technology, Feb. 1, 2008, 3 pages.

Indure E1500 HG—Thermoplastic Polyolefin Elastomer Fact Sheet, LyondellBasell Advanced Polyolefins USA, Inc., Sep. 11, 2008, 1 page.

EPO: Supplementary European Search Report dated Sep. 20, 2010 for Application 09711523.2-2124 (9 pages).

Markus Ansorge, Communication Pursuant to Article 94(3), EPO Application No. 09711523.2 (Jul. 4, 2011).

Markus Ansorge, Communication Pursuant to Article 94(3), EPO Application No. 09711523.2 (Dec. 19, 2011).

PCT International Search Report and Written Opinion issued Aug. 4, 2009 for PCT/US09/42704 (17 pages).

PR Newswire—Press Release: "A. Schulman Expands TPO Sheet Offering with Two New Invision(R) Products," Jul. 8, 2008, http://www.forbes.com/prnewswire/feeds/prnewswire/2008/07/08/prnewswire200807080830... (2 pages printed Jul. 14, 2008).

* cited by examiner

MULTILAYER CLEAR OVER COLOR POLYOLEFIN SHEETS AND LAYERED BACKING STRUCTURE

CROSS REFERENCE TO RELATED APPLICATION

This application is a continuation of U.S. application Ser. No. 12/548,946, filed on Aug. 27, 2009, which was a continuation of PCT Application No. PCT/US2009/042704, which was filed on May 4, 2009, which in turn claimed the benefit of priority from U.S. Provisional Application No. 61/050,465, filed on May 5, 2008. These prior applications, including the written description and drawing figures, are hereby incorporated into the present application by reference.

BACKGROUND

Many different types of articles produced today are formed from coextruded or laminated sheets. For the composition of these sheets there are several different types of competing technologies, such as painted plastic, solvent cast fluoroacrylic film, coextruded ionomer decorative sheet, painted metal, & coextruded acrylic/ABS sheet.

For many polymeric articles of manufacture, optical and durability characteristics are very important. Particularly in the transportation industry, the qualities of distinction of image, gloss, imprint resistance, scratch resistance, mar resistance, and corrosion resistance are highly desirable among other measures of durability and optical quality. Achieving a balance of excellent optical qualities and excellent durability qualities is a difficult endeavor and is complicated by the unpredictability of chemical interactions between various materials used in such compositions. It is particularly difficult to achieve an excellent balance of properties in a final formed product that has been subjected to heat and/or elongation.

In addition, sheet formed thermoplastic polyolefin (TPO) typically includes a mixture of both virgin polymer and regrind polymer. TPO is a blend of an olefin, an elastomer, and a filler such as talc. The addition of regrind polymer is considered a necessary practice within the sheet extrusion industry in order to control costs by minimizing waste and reducing the overall raw material cost of the final part. Although the economics improve with the addition of regrind, the added regrind contributes to a lower melt strength and the sag resistance of the sheet is significantly reduced. A low sag resistance can cause defects such as excessive "webbing" in tight corners, surface tears in areas of high stretch, and non-uniform wall thickness. Significant variation in wall thickness throughout a part can cause excessive warping and/or deterioration of physical properties.

SUMMARY

This application describes novel multilayer structures that include a clear polyolefin layer, a colored polyolefin layer, and a random polyolefin backing layer. The colored and backing layers are coextruded and are permanently bonded at a layer interface. In another embodiment, the clear polyolefin layer is also coextruded and permanently bonded over the colored backing layer. These structures have a DOI of 70 or greater and pass a gravelometer impact test per the GM9508P standard, with a 10 pint load, at a −30° C. temperature, and at an impact angle of 30 degrees. The multilayer structures retain DOI and gravelometer impact standards as stated above even after being subjected to heat and/or elongation to make a final formed product. Among other uses, the structures are appropriate for use as vehicle body panels.

A formed product is described that includes a coextruded clear isotactic polypropylene/ethylene copolymer layer of 1 mil to 20 mils in thickness, alternatively 2.5 mils to 20 mils in thickness; a coextruded colored isotactic polypropylene/ethylene copolymer layer of 3 mils to 20 mils in thickness, alternatively 1 mil to 20 mils in thickness; and a polyolefin backing layer with a random microstructure. The clear and color layers are coextruded and are permanently bonded at a layer interface. The formed product has a DOI of 70 or greater. The formed product is substantially non-oriented by stretching. The formed product has a gloss of 75 or greater at a 60° angle and a gloss of 60 or greater at a 20° angle. The clear polyolefin layer has a light transmittance of 90% or greater. The clear polyolefin layer has a haze of 10 or less. The formed product exhibits no gauze imprint at 70° C. minimum under a 500 g load applied over a 40 mm diameter for two hours. The formed product passes a gravelometer impact test per the GM9508 standard, with a 10 pint load, at a −30° C. temperature, and at an impact angle of 30 degrees.

A vehicle body panel is described herein that includes a multilayer structure. The multilayer structure includes a coextruded clear isotactic polypropylene/ethylene copolymer layer of 1 mil to 20 mils in thickness, alternatively 2.5 mils to 20 mils in thickness; a coextruded colored isotactic polypropylene/ethylene polyolefin layer of 1 mils to 20 mils thick, alternatively 3 mils to 20 mils in thickness; and a polyolefin backing layer with a random microstructure. The clear and color layers are coextruded and are permanently bonded at a layer interface. The structure has a DOI of 70 or greater. The structure is substantially non-oriented by stretching. The structure has a gloss of 75 or greater at a 60° angle and a gloss of 60 or greater at a 20° angle. The clear polyolefin layer has a light transmittance of 90% or greater. The clear polyolefin layer has a haze of 10 or less. The structure exhibits no gauze imprint at 70° C. minimum under a 500 g load applied over a 40 mm diameter for two hours. The structure passes a gravelometer impact test per the GM9508 standard, with a 10 pint load, at a −30° C. temperature, and at an impact angle of 30 degrees. Furthermore, the clear and/or color layers include an additive selected from the group consisting of: antioxidants, UV stabilizers, slip agents, and combinations of these.

In another embodiment, a multilayer structure includes a clear polyolefin layer, and a colored polyolefin backing layer with a random microstructure. The clear and backing layers are coextruded and are permanently bonded at a layer interface. The interface is exclusive of an adhesive layer, and the structure has a DOI of 70 or greater. In addition, the structure passes a gravelometer impact test per the GM9508P standard, with a 10 pt load, at a −30° C. temperature, and at an angle of 30 degrees.

A method of forming the above structures is also described.

This application further describes a multilayer structure that includes a first thermoplastic layer having a polymeric component consisting essentially of virgin polyolefin, a second thermoplastic layer including regrind polyolefin, and an optional third thermoplastic layer having a polymeric component consisting essentially of virgin polyolefin. The second thermoplastic layer is adjacent to the first thermoplastic layer and the third thermoplastic layer, if present.

A method for forming a multilayered polymeric structure is also described. The method includes: coextruding a first thermoplastic layer having a polymeric component that consists essentially of a virgin polyolefin with a second thermoplastic layer that includes regrind polyolefin, and optionally with a third thermoplastic layer having a polymeric component that consists essentially of a virgin polyolefin. The second thermoplastic layer is adjacent to the first thermoplastic layer and the third thermoplastic layer, if present.

DETAILED DESCRIPTION

Figure 1:
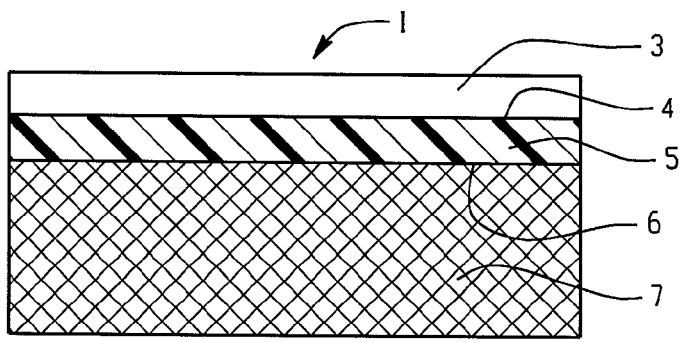
FIG. 1 is a cross-sectional view of an example coextruded three-layer film.

The example multilayer structures disclosed herein provide a paint-free plastic sheet structure that may be designed to simulate the appearance of painted metal or plastic. Example multilayer structures include a clear polyolefin layer over a colored polyolefin layer. Another example is a multilayer structure with a clear polyolefin layer over a translucent polyolefin layer, over a color polyolefin layer. For each of these examples the multi-layer structures are provided with a thermoplastic polyolefin backing layer. Yet another example includes a clear polyolefin layer over a colored backing layer. Preferably, there is no adhesive layer at the interface between the clear layer and the color layer and there is no adhesive layer at the interface between the layer attached to the backing layer. Most preferably, the interface between all layers of the multilayer structures is free of all adhesives. An additional disposable mask layer may be provided on each of the example structures. Furthermore, in some examples, more than one color layer, more than one clear layer, and/or more than one backing layer may be employed.

The example multilayer structures may be formed into an article or laminated onto a substrate to produce an article. Example articles include a vehicle body panel, bumper fascia, and rocker panel.

In the field of polymeric multilayer sheets, compositional design changes that result in improvements in one or more optical or material characteristics typically result in a deterioration in another optical or material characteristic. For example, modifying a product to make it more durable will likely result in a deterioration in optical qualities. This is partly due to the unpredictable nature of the chemical interactions, differences in refractive indexes of the blended components, and component compatibilities. This makes it quite difficult to achieve a balance of excellent properties across several categories of optical and durability characteristics.

The example multilayer structures display an excellent balance of properties. Improvements in durability and weatherability were realized without sacrificing the appearance requirements needed (DOI—70 min, 85 min preferred; Gloss—75 min @ 60 degrees, 60 min @ 20 degrees) in order to achieve a "Class A" finish on parts of 0% stretch or greater. These improvements enable the multi-layer structures to be used by auto manufacturers and others as vehicle panels, bumper fascias, and/or rocker panels, among other uses.

In the example multilayer structures, a combination of several design elements produces the desired balance of excellent properties. An efficient, reduced-layer structure is employed that does not require an adhesive to bond the layers of the structure together. Like chemistries in the bonded layers allows the layers to bond to each other at the layer interface. Coextrusion technology promotes the bonding of layers and provides a smooth finish. Appropriate selection of polyolefins, additives, and pigmentation for each layer also contributes to the balance of properties. In addition, further processing techniques and additives are also used to optimize the optical and durability characteristics of the multilayer structures.

The clear layer, the color layer, and the backing layer of the example multilayer structures are permanently bonded by using like chemistries. Like chemistries in this application means belonging to same family of olefinic hydrocarbons. Each layer is coextruded from a like olefinic material. This results in permanent bonding at each layer interface between the like olefinic materials. By eliminating the adhesive at the interface, the durability of the multilayer structures is improved. As mentioned above, the bond at each layer interface is permanent which results in a product that does not delaminate when exposed to heat, sunlight, extreme cold, humidity, water immersion, chemicals, and gravel impact. In contrast, if there were a coextruded adhesive layer interposed between the layers it would create a structure that inherently has a "weak link" that could fail and result in delamination. In addition, the example multilayer structures have a ΔL of 2 or less, according to the GM9302P stress whitening resistance standard. An added benefit to the adhesive-layer-free structures is that the sheet product becomes less complex to manufacture.

The clear layer, the color layer, and the backing layer of the multilayer structures are primarily composed of an olefinic material. For example, polypropylene/ethylene copolymer may be used as the olefinic material for each layer.

Figure 2:
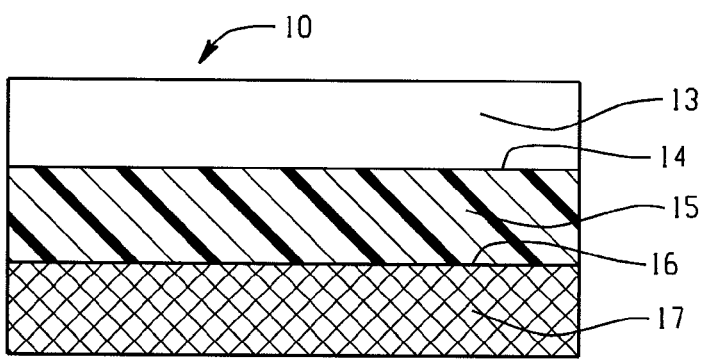
FIG. 2 is a cross-sectional view of an example three-layer film for lamination.

FIGS. 1 and 2 both show example three-layer coextruded olefinic sheet structures.

FIG. 1 illustrates an example sheet structure 1 that can be used to make both thick and thin sheets. A multilayer structure as thin as 3 mils to as thick as 540 mils may be created according to this sheet structure 1. Multilayer structures of intermediate thicknesses may also be created, for example, 8.5 mils to 540 mil, 20 mils to 450 mil, 50 mils to 300 mil, or 150 mils to 250 mils. Relatively thick sheets may be used in applications where it is desired to thermoform a part directly from the sheet itself, or thinner sheets may be desirable to thermoform a shell that is suitable to be backfilled via injection molding to achieve the final thickness. Other processes that can be used with this type of sheet/film structure include compression molding and simultaneous in-mold thermoforming/injection backfill processes.

The clear layer 3 is 1 to 20 mils in thickness, for example, 2.5 to 20 mils, 3.0 to 15 mils, or 5.0 to 10 mils. It is primarily made of a polyolefin, such as a polypropylene/ethylene copolymer. An example polypropylene/ethylene copolymer for use in the clear layer 3 has a monomer ratio of 0.5-12% ethylene, such as 1-7%, 2-10%, or 3-7% ethylene. The example polypropylene/ethylene copolymer may be isotactic, such as greater 70%, greater 80%, or greater than 90% isotactic and have a random microstructure. The crystallinity of the example polypropylene/ethylene copolymer may be greater than 60%, such as greater than 70%, or greater than 90%. The example copolymer may have a Rockwell hardness of R80 or greater, such as R100 or greater, or R105 or greater. The melting point of the example copolymer is greater than 155° C., such as, 156° C. to 300° C., 156° C. to 170° C., or 156° C. to 165° C. The example polypropylene/ethylene copolymer may have a flexural modulus of greater than 1850 MPa, such as 1900 to 2500 MPa, or 2000 to 2100 MPa. A blend of polyolefins may also be employed in the clear layer 3; for example, a blend of majority isotactic polyolefin and a minority of syndiotactic polyolefin or atactic polyolefin. Example isotactic polyolefins include those sold under the following trade names: INSPIRE 404 polypropylene (Dow), CLYRELL RC514 L (LyondellBasell), INSPIRE 117 polypropylene (Dow), SR257M (LyondellBasell), 6289MZ (Total), 6D83K (Dow), and PRISMA 3410 polypropylene (Braskem). Example syndiotactic polyolefins include those sold under the following trade names: TOTAL Polypropylene 1251 (2 MI, 6.9% Haze, 130° C. melt point) and TOTAL polypropylene 1471 (4 MI, 4.8% Haze, 130° C. melt point). Another example polyolefin is NOTIO from Mitsui Chemicals (Haze 4-7%, Melt point 100° C.-135° C.). An example atactic polypropylene is FF018F from Sunoco (1.8 Melt Flow g/10 min at 230 C with 2.16 kg weight). A metallocene-based copolymer or homopolymer of propylene may also be used. INSPIRE 404, for example, is a highly isotactic, highly crystalline polypropylene/ethylene copolymer containing about 1-7% ethylene monomer. It has a flexural modulus of 2070 MPa (⅛ inch bar), a melting point of 156° C., an enthalpy of melting of 96 J/g, and a Rockwell hardness of R105 hardness. Additives, such as UV stabilizer, e.g. CYASORB THT 7001 (Cytec Industries), Antioxidants, e.g. HOSTANOX PEP-Q (Clariant), and slip agents, e.g. CRODAMIDE ER (Croda), may also be added to the polyolefin.

The clear layer 3 should have a light transmittance of 85-100%, such as 88-100%, or 90-100%. It should also have a haze of no greater than 10%, such as no greater than 8%, no greater than 5%, no greater than 2.5%, or no greater than 1.0%. For certain applications it may be desirable to include a small amount of pigment or special effects in the clear layer 3.

The color layer 5 is 1 to 20 mils in thickness, for example 3.0 to 20 mils, 4.0 to 15 mils, or 5.0 to 10 mils. The color layer 5 is primarily made of a polyolefin, such as polypropylene/ethylene copolymer. Preferably, the clear layer 3 and the color layer 5 will have like chemistries, that is, they will be of the same type of polyolefin and similar enough in properties that when coextruded as layers they will become chemically bonded at the clear/color layer interface 4. As such, an example polypropylene/ethylene copolymer for use in the color layer 5 has a monomer ratio of 0.5-12% ethylene, such as 2-10%, or 3-7% ethylene. The example polypropylene/ethylene copolymer may also be isotactic, such as 60-90%, or 70-85% isotactic and have a random microstructure. The crystallinity of the example polypropylene/ethylene copolymer may be greater than 60%, such as greater than 70%, or greater than 90%. The example copolymer may have a Rockwell hardness of greater R100, such as R105 or greater. The melting point of the example copolymer is greater than 155° C., such as 156° C. to 300° C., 156° C. to 170° C., or 156° C. to 165° C. The example polypropylene/ethylene copolymer may have a flexural modulus of greater than 1000 MPa, such as greater than 1850 MPa, for example as 1900 to 2500 MPa, or 2000 to 2100 MPa. A blend of polyolefins may also be employed in the color layer 5; for example, a blend of majority isotactic polyolefin and a minority of syndiotactic or atactic polyolefin. Example isotactic polyolefins include those sold under the following trade names: INSPIRE 404 polypropylene (Dow), CLYRELL RC514 L (LyondellBasell), INSPIRE 117 polypropylene (Dow), SR257M (LyondellBasell), 6289MZ (Total), 6D83K (Dow), and PRISMA 3410 polypropylene (Braskem). Example syndiotactic polyolefins include those sold under the following trade names: Polypropylene 1251 (Total Petrochemicals) (2 MI, 6.9% Haze, 130° C. melt point) and Polypropylene 1471 (Total Petrochemicals) (4 MI, 4.8% Haze, 130° C. melt point). Another example polyolefin is NOTIO from Mitsui Chemicals (Haze 4-7%, melt point 100° C.-135° C.). An example atactic polypropylene is FF018F from Sunoco (1.8 Melt Flow g/10 min at 230 C with 2.16 kg weight). A metallocene-based homopolymer or copolymer of propylene may also be used. Additives, such as UV stabilizer, e.g. CYASORB THT 7001, Antioxidants, e.g. HOSTANOX PEP-Q (Clariant), and slip agents, e.g. CRODAMIDE ER (Croda), may also be added to the polyolefin.

The color layer 5 contains pigment, including opaque pigments, translucent pigments, and special effect pigments such as metal flake, pearlescent, fluorescent, phosphorescent, & mirrored glass. Typically, the color layer 5 will be essentially opaque, such as 10% to 0%, 5% to 0.1%, or 1% to 0.01% light transmittance.

Regarding the pigmentation of the color layer 5 (and other polyolefin layers when desired), the pigment is introduced into the layer 5 as a pigment/carrier pre-dispersion. The carrier and pigment are mixed in a pre-dispersion, and then added to the color layer 5 polyolefin before coextrusion. The carrier is a polymer resin that is selected based on its ability to mix well with the polyolefin and pigment and not negatively affect the properties of the structure, during or after processing. Pigments compatible with the pigment pre-dispersions disclosed herein include organic and inorganic pigments. Examples of the types of pigments that can be included in such a pigment pre-dispersion include, but are not limited to, carbon black, titanium dioxide, zinc oxide, calcium carbonate, black iron oxide, red iron oxide, yellow iron oxide, green iron oxide, mixed metal oxides, bismuth vanadate, phthalocyanine blue, phthalocyanine green, quinacridone reds, anthraquinone, perylene reds, polyazos, or mixtures thereof. Generally, organic pigments are smaller and more difficult to disperse than inorganic pigments. Examples of resins compatible with polyolefins for use in the claimed pigment pre-dispersions include, ethylene/acrylic acid copolymer waxes, ethylene/acrylic acid copolymer resins, ethyl methyl acrylate copolymer, and polypropylene/ethylene copolymers, such as TC-110 EMA (Exxon Mobil), AC540 wax (Honeywell), INSPIRE 404, and PRIMACOR 1410 (Dow).

Many factors can affect the choice of a carrier resin for use in a pigment pre-dispersion. Specifically at issue is the compatibility of a carrier resin with the polyolefin into which it will be blended. The refractive index of a carrier resin compatible with a polyolefin may be very close to the refractive index of the polyolefin, e.g., within 0.005 of the refractive index of the polyolefin (sodium-D filter at 20° C.). Typically, it is advantageous to select a carrier resin with a melt flow rate that is greater than or equal to the melt flow rate of the polyolefin when measured at the same temperature and load as the polyolefin. Melt flow rate may be measured, for example, according to ASTM D1238. Furthermore, a carrier resin should also be compatible and miscible with the polyolefin into which it will be blended. The appearance properties of the final product improve as the compatibility between the carrier resin and the polyolefin increases.

The particle size of the pigment should generally be minimized to optimize dispersion of the pigment in the polyolefin. As different pigments are unique compounds having widely varying sizes and molecular properties, there is no single size that can be suggested as optimal. Generally, the quality of the dispersion achieved upon mixing a pigment pre-dispersion with a polyolefin will be improved with smaller pigment particles. Typically, pigment particle sizes in a pigment pre-dispersion of less than or equal to about 25 micrometers are capable of being well dispersed. Thus, the pigments used in the multilayer structure should have a particle size of less than or equal to about 25 micrometers, such as 25 micrometers, 15 micrometers, or 10 micrometers.

The pre-dispersion can be made as described in the co-owned U.S. application Ser. No. 11/592,883, titled, "Ionomer Pigmentation," which is hereby incorporated by reference.

The pigment pre-dispersion may be added to the polyolefin as the polyolefin is processed in an apparatus such as an extruder. The pigment pre-dispersion can be pre-mixed with polyolefin pellets or powder prior to the polyolefin being added to the processing apparatus. Additionally, the pigment pre-dispersion can be let down into an intermediate carrier and this intermediate mixture can then be blended with the polyolefin. If let down into an intermediate carrier, the pigment pre-dispersion level can be, for example, about 25% to about 50% of the intermediate mixture. The intermediate mixture may then be mixed with a polyolefin at a level, for example, of about 2% to about 10% of the polyolefin.

The example backing layer 7 of FIG. 1 is 1 to 500 mils in thickness, for example 3 to 500 mils, 10 to 300 mils, or 100 to 200 mils. The example backing layer 7 is primarily composed of a thermoplastic polyolefin, such as polypropylene/ethylene copolymer. The thermoplastic polyolefin is preferably of a random microstructure, and may be exclusive of block copolymers. Example random isotactic polyolefins include high-impact copolymers, for example those having 7 to 30% ethylene homo or copolymer content, such as Pro-Fax 7823 PP (LyondellBassell). Other example random isotactic polyolefins include those sold under the following trade names: INSPIRE 404 polypropylene (Dow), CLYRELL RC514 L (LyondellBasell), INSPIRE 117 polypropylene (Dow), SR257M (LyondellBasell), 6289MZ (Total), 6D83K (Dow), and PRISMA 3410 polypropylene (Braskem). Example random syndiotactic polyolefins include those sold under the following trade names: Total Polypropylene 1251 (2 MI, 6.9% Haze, 130° C. melt point) and Total Polypropylene 1471 (4 MI, 4.8% Haze, 130° C. melt point). Another example polyolefin is NOTIO from Mitsui Chemicals (Haze 4-7%, melt point 100° C.-135° C.). A metallocene-based homopolymer or copolymer of propylene may also be used.

The example backing layer also may contain an elastomer, such as, for example, ethylene alpha-olefin copolymers where the alpha-olefin portion can contain 3-20 carbon atoms. Examples of such materials include but are not limited to ethylene octene copolymer, ethylene butene copolymer, ethylene hexene copolymer, ethylene heptene copolymer. These type of alpha olefins represent the following PE families: LDPE, VLDPE, ULDPE. Additional elastomers include, but are not limited to, ethylene propylene copolymer, ethylene propylene diene terpolymer, ethylene alpha-olefin diene terpolymer, styrenic block copolymer including styrene-butadiene-styrene and styrene-ethylene-propylene-styrene. The very low density polyethylene rubber may have a density of 0.75 to 0.95 g/cm$^3$, such as about 0.88 g/cm$^3$. Preferably, the backing layer 7 and the color layer 5 will have like chemistries, e.g. olefinic. An example backing layer 7 includes 40-95%, 60-80%, such as 55-70%, of a propylene/ethylene copolymer, the propylene/ethylene copolymer may have a monomer ratio of 0.5-12% ethylene, such as 1-7%, 2-10%, or 3-7% ethylene. The elastomer component when present may make up 50% or less of the backing layer, such as 5-40%, 10-35%, or 6-10%.

A filler, such as talc may constitute 0-40%, such as 20-30%, or 22-28% of the example backing layer. Furthermore, various other additives such as process aids, dispersing aids, UV stabilizers, antioxidants, and nucleators may also be utilized in the backing layer in small amounts, such as 0.001% to 10%, 0.01% to 5.0%, or 0.1 to 3.5%. Examples of such additives include TR016 wax (Struktol) (process aid & dispersing aid), CHIMASSORB 119 (Ciba) (UV stabilizer), SYNPRO 12B calcium stearate (Ferro) (process aid & dispersing aid), IRGANOX 3114 (Ciba) (antioxidant), HOSTANOX PEP-Q (Clariant) (antioxidant), VANOX ZMTI (R. T. Vanderbilt) (antioxidant), and HPN 20E (Milliken) (nucleator). The backing layer 7 may also include pigment and/or effect materials in some applications.

FIG. 2 shows an example sheet structure that is similar to example structure 1 shown in FIG. 1, however, the sheet structure of FIG. 2 is a multilayer tape structure 10. Although the example multilayer tape structure 10 itself is coextruded, the tape structure 10 may be applied to a substrate during a lamination process. In this case, the multilayer tape structure 10 would be laminated to another substrate prior to, during, or after the forming of an article. In order to achieve good adhesion after lamination, the backing layer 17 in this structure may contain an additional adhesive component that will have a lower melting point compared to the other existing olefinic ingredients. The lamination may be by melt lamination or by an additional laminated adhesive layer. Examples of laminated adhesive layer include pressure-sensitive tape, roll-applied adhesive, and two-sided tape. It is also possible to omit the adhesive component if the backing layer 17 will adhere to a desired substrate sufficiently without the adhesive. As adhesive components are added to the backing layer 17, the addition of a release liner, such as the mask layers described in the commonly owned WIPO Publication WO 2006/014281, titled "Co-extruded Mask Layer," which is hereby incorporated by reference, may be helpful in order to prevent the roll from sticking to itself. The mask layer described in WO 2006/014281 is co-extruded with the polymer layer and the mask layer exhibits a low level of adhesion with the polymer layer. The mask layer can adhere to the polymer layer during thermoforming and other secondary processing steps. A multilayer tape structure 10 as thin as 3 mils to as thick as 25.0 mils, such as 5.0 mils to 25.0 mils may be created. Multilayer tape structures 10 of intermediate thicknesses may also be created, for example, 10.0 to 20.0 mil, or 12.0 to 18.0 mils.

The example clear layer 13 of FIG. 2 is 1 to 10.0 mils in thickness, for example 2.0 to 10.0 mils, 3.0 to 8.0 mils, or 4.0 to 6.0 mils. Otherwise, the example clear layer 13 of the tape structure 10 is essentially the same as the example clear layer 3 of FIG. 1, described above.

The example color layer 15 of FIG. 2 is 1 to 10 mils in thickness, for example 2.0 to 10.0 mils, 3.0 to 8.0 mils, or 4.0 to 6.0 mils. Otherwise, the example color layer 15 of the tape structure 10 is essentially the same as the example color layer 5 of FIG. 1, described above.

The example backing layer 17 of FIG. 2 is 1 to 5.0 mils in thickness, for example 1.5 to 4.5 mils, or 2.0 to 4.0 mils. The example backing layer 17 of the tape structure 10 is essentially the same as the example backing layer 7 of FIG. 1, described above, except it contains an adhesive as part of the polymeric blend. The adhesive component may be used in practically any weight percentage in the backing structure, for example, 60 to 100%, 20-60%, 30-50%, or 35-45%. The adhesive component may be olefinic polymers, or copolymers such as polypropylene/ethylene copolymers with a high level of ethylene monomer content, and a low melting point, for example, ethylene alpha-olefin copolymers where the alpha-olefin portion can contain 3-20 carbon atoms. Examples of such materials include, but are not limited to, ethylene octene copolymer, ethylene butene copolymer, ethylene hexene copolymer, ethylene heptene copolymer. These type of alpha olefins represent the following polyethylene families: LDPE, VLDPE, ULDPE. Additional elastomers include, but are not limited to, ethylene propylene copolymers, ethylene propylene diene terpolymer, ethylene alpha-olefin diene terpolymer, styrenic block copolymers including styrene-butadiene-styrene, styrene-ethylene-propylene-styrene and the like, a particular example of ethylene-propylene elastomer is VERSIFY 2300 (Dow). The adhesive component could also include, but is not limited to, other olefinic or non-olefinic materials such as ethylene-acrylate-GMA terpolymers, ethylene butyl (or methyl or hexyl) acrylate copolymers, EVA, ester and ether based urethanes, ethylene acid copolymers, and maleic anhydride grafted copolymers.

Varying the type of adhesive component in polymeric blend allows the multilayer structure to be laminated to different substrates, including, but not limited to: polypropylene, TPO, polyethylene, a polymeric blend or alloy containing polypropylene or polypropylene in it, ABS, ABS containing blends or alloys, acrylic, polycarbonate, polycarbonate containing blends or alloys, metal, glass, wood, ceramic, thermoset plastics, and composites. The adhesive layer 17 may be provided with pigment and/or effect material.

Figure 3:
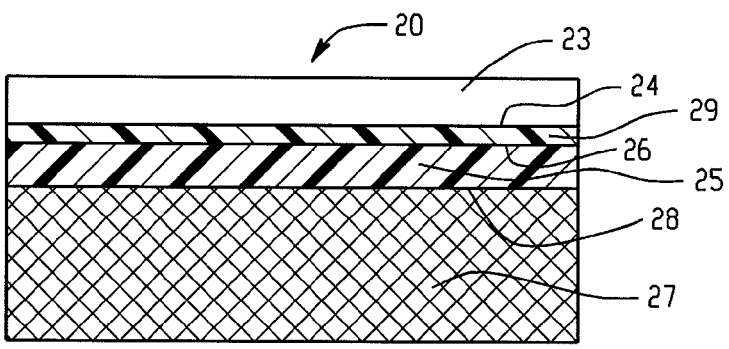
FIG. 3 is a cross-sectional view of an example coextruded four-layer film.
Figure 4:
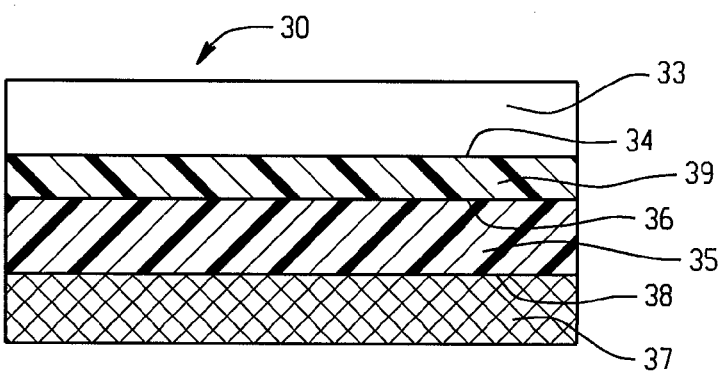
FIG. 4 is a cross-sectional view of an example four-layer film for lamination.

FIGS. 3 and 4 depict the four-layer structure 20, 30 counterparts of the three-layer structures 1, 10 of FIGS. 1 and 2. As such, the four-layer structures 20, 30 are used in substantially the same manner as described for FIGS. 1 and 2, respectively, and are similar in composition, except as noted below. The four-layer structures 20, 30 in FIGS. 3 and 4 each have a clear layer 23, 33, a color layer 25, 35, and a backing layer 27, 37. The structures of FIGS. 3 and 4, however, differ from the structure of FIGS. 1 and 2 in that each has a translucent color layer 29, 39 between the clear 23, 33 and color layers 25, 35. The translucent color layer 29, 39 is primarily made of a polyolefin, such as polypropylene/ethylene copolymer. An example polypropylene/ethylene copolymer for use in the translucent color layer 29, 39 has a monomer ratio of 0.5-12% ethylene, such as 2-10%, or 3-7% ethylene. The example polypropylene/ethylene copolymer may also be isotactic, such as 60-90%, or 70-85% isotactic and have a random microstructure. The crystallinity of the example polypropylene/ethylene copolymer may be greater than 60%, such as greater than 70%, or greater than 90%. The example copolymer may have a Rockwell hardness of greater R100, such as R105 or greater. The melting point of the example copolymer is greater than 155° C., such as 156° C. to 300° C., 156° C. to 170° C., or 156° C. to 165° C. The example polypropylene/ethylene copolymer may have a flexural modulus of greater than 1000 MPa, such as greater than 1850 MPa, 1900 to 2500 MPa, or 2000 to 2100 MPa. A blend of polyolefins may also be employed in the translucent color layer 29, 39; for example, a blend of majority isotactic polyolefin and a minority of syndiotactic or atactic polyolefin. Example random isotactic polyolefins include those sold under the following trade names: INSPIRE 404 polypropylene (Dow), CLYRELL RC514 L (LyondellBasell), INSPIRE 117 polypropylene (Dow), SR257M (LyondellBasell), 6289MZ (Total), 6D83K (Dow), and PRISMA 3410 polypropylene (Braskem). Example random syndiotactic polyolefins include those sold under the following trade names: Polypropylene 1251 (Total) (2 MI, 6.9% Haze, 130 C melt point) and Polypropylene 1471 (Total)(4 MI, 4.8% Haze, 130 C melt point). Another example polyolefin is NOTIO from Mitsui Chemicals (Haze 4-7%, Melt point 100 C-135 C). An example atactic polypropylene is FF018F from Sunoco (1.8 Melt Flow g/10 min at 230 C with 2.16 kg weight). A metallocene-based homopolymer or copolymer of propylene may also be used. This translucent color layer may be used to create various special effects such as metal flake, pearlescent, fluorescent, phosphorescent, and mirrored glass and/or improve the depth of color for the underlying opaque color layer. The polyolefin that makes up the translucent color layer may be of the same chemistry as the clear 23, 33 and color layers 25, 35 to promote adhesive-free bonding at the layer interfaces 24, 34, 26, 36, 28, 38.

The translucent color layer 29, 39 does not require that only translucent pigments are used therein. In this case, "translucent" is meant to refer to the percent loading of color used in the translucent layer 29, 39. All pigments used in the color layer 25, 35 can also be used in the translucent layer 29, 39, but are used in lower amounts (relative to the underlying essentially opaque color layer 25, 35) in order to maintain some level of the base resin clarity.

Regarding the example four-layer structure of FIG. 3, the structure 20 may be as thin as 4.0 mils to as thick as 560 mil, such as 11 mils to 560 mils. Multilayer structures of intermediate thicknesses may also be created, for example, 20 mils to 450 mil, 50 mils to 300 mil, or 150 mils to 250 mils. Relatively thick sheets may be used in applications where it is desired to thermoform a part directly from the sheet itself, or thinner sheets may be desirable to thermoform a shell that is suitable to be backfilled via injection molding to achieve the final thickness. The translucent layer 29 may be 1 to 20 mils in thickness, such as 2.5 to 20 mils, 5.0 to 15 mils, or 7.0 to 12.0 mils.

Regarding the example four-layer tape structure 30 of FIG. 4, the structure 30 may be as thin as 4 mils to as thick as 35.0 mils. Multilayer structures of intermediate thicknesses may also be created, for example, 7 mils to 35 mils, 8.0 mils to 30.0 mils, 10 mils to 20.0 mils, or 12.0 mils to 18.0 mils. The translucent layer 39 is 1 to 10 mils in thickness, for example 2.0 to 10 mils, 3.0 to 8.0 mils, or 4.0 to 6.0 mils. As with the tape structure 10 of FIG. 2, the four-layer tape structure 30 would be laminated to another substrate prior to or during the forming of an article. In order to achieve good adhesion after lamination, the backing layer 37 in this structure 30 may contain an additional adhesive component that will have a lower melting point compared to the other existing olefinic ingredients.

Figure 5:
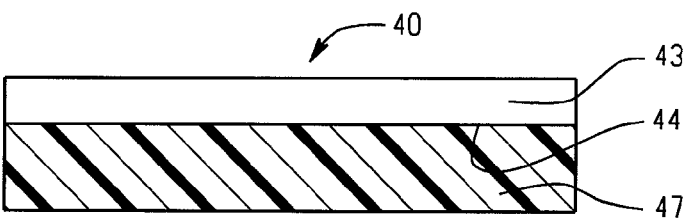
FIG. 5 is a cross-sectional view of an example coextruded two-layer film.

FIG. 5 depicts an example two layer structure 40 that includes a clear polyolefin layer 43 over a colored backing layer 47. The clear layer 43 has the same characteristics as the example clear layer 3 of FIG. 1, except that it is coextruded with and permanently bonded directly to the colored backing layer 47 at a layer interface 44. The colored backing layer 47 is the same as the backing layer 7 of FIG. 1, except it is provided with pigment and/or effect materials. Carrier resins may also be used to incorporate the pigment and/or effect materials into the colored backing layer 47. Example carrier resins, pigments, and effect materials may be selected from those listed above in the discussion of the color layer 7 of FIG. 1. The carrier resin, however, should be carefully selected to be compatible with the majority component polymer of the colored backing layer 47. That is, the carrier resin should have similar melt flow rate, refractive index, and be miscible in the majority component polymer. The pigment and/or effect materials may be incorporated into the colored backing layer 47 in an amount of 0.0001% to 30%, for example, 0.01% to 20%, 1.0% to 10%, or 0.0001% to 0.01%.

In an alternative example, the clear polyolefin layer 43 may be replaced with a colored layer as described above having pigments and/or effect materials.

Some examples of different formed products in which this two layer structure is used include: RV exterior wall panels, heavy truck and RV air cones, fenders or body panels for agricultural vehicles, and truck farings.

The structures 1, 10, 20, 30, 40 shown in FIGS. 1-5 may be used with or without a mask layer, such as a protective mask, forming mask, or combination of protective/forming mask, for example, the mask layers described in WIPO Publication WO 2006/014281. The mask layer could be laminated onto or coextruded with the structures illustrated in FIGS. 1-4.

In order to improve or modify the performance of an individual layer or the structure as a whole, each layer shown in FIGS. 1-5 may contain additive ingredients from the following list in any combination. The list is as follows:

Antioxidants
UV stabilizers
Waxes as Property Modifiers
Lubricants
Antistats
Process Aids
Dispersion Aids
Flame Retardants
Smoke Suppressors
Foaming Agents
Colorants (pigments, dyes, all special effect additives)
Antimicrobials
Antiblock Agents
Fiber Additives
Plasticizers (e.g. polypropylene plasticizers such as Elevast or polyethylene-glycol)
Antifog Agents
Clarifying Agents
Nucleating Agents
Acid Scavengers
Low Temperature Impact Modifiers
Fillers (inorganic & wood)
Gloss Agents
Gloss Reducing Agents
Scratch Mar Additives
Stress Whitening Modifiers
Surfactants
Silicone, Siloxanes, Organo-Modified Siloxanes, or Silicone Graft Copolymers (e.g., Evonik Tegomer which may contain alkyl, epoxide, hydroxy, amino, carboxyl, and/or acrylate organic substituents)
Functional grafted polypropylene modifiers (e.g. acid grafted polypropylene, maleic anhydride grafted polypropylene, and ionic functional grafted polypropylene)

In particular, one or more clarifying agents may be added to polymers that are already clarified by various methods or the clarifying agents may be added to non-clarified polymers. Stress whitening agents may be added to improve blush resistance.

The aforementioned additives may also be utilized in each layer in relatively small amounts, such as 0.0001% to 10%, 0.0001% to 0.001%, 0.0001 to 1%, 1% to 5%, and 5% to 10%, and for fillers, fibers, retardants, functional grafted polypropylene modifiers, and smoke suppressor additives, up to 50%, such as up to 40%, or 10-30%.

The example multilayer structures are not substantially oriented either axially or biaxially by stretching. By not substantially oriented, it is meant that the polymers are not purposely stretched to induce orientation that would affect the physically properties of the material. The multilayer structure may have a flexural modulus of 1000 MPa or greater, such as 1500 to 7000 MPa, 1700 to 3000 MPa, 3000 to 6000 MPa, or 2500 to 5500 MPa.

The example multilayer structures display excellent optical qualities. The example multilayer structures have a distinction of image (DOI) of at least 70, such as 75 or greater, 85 or greater, 90 or greater, and 95 or greater. Furthermore, the multilayer structures have a gloss of 75 or greater at a 60° angle, such as 85 or greater, 90 or greater, and 95 or greater. The multilayer structures also have a gloss of 60 or greater at a 20° angle, such as 70 or greater, 80 or greater, and 85 or greater.

The example multilayer structures also posses excellent durability and mar resistance, exemplified by several tests required by auto manufacturers (see Table 2 below). For instance, the multilayer structures will pass a five-finger scratch and mar resistance test defined by GMW 3943. The structures also exhibit no gauze imprint at 70° C. minimum under a 500 g load applied over a 40 mm diameter for two hours. Furthermore, the multilayer structures show no signs of gloss loss, staining, or surface swelling at 70° C. with exposure to methanol, motor oil, lithium grease, and egg albumin.

The multilayer structures can be thermoformed into formed products, such as, for example, an automobile bumper or other exterior trim panel. Such a part can be made from a multilayer structure that is thick enough to provide sufficient structural stability to be used alone. Furthermore, the multilayer structure can be injection molded from behind with additional polymer material to provide support to the multilayer structure. The pigmented polyolefins with their minimized pigment particle size are able to maintain color uniformity and opacity in high draw regions created during thermoforming.

The layers of the multilayer structures are coextruded and include those layers shown in FIGS. 1-5 and described herein. Additional co-extruded layers can include, but are not limited to, polymers such as polypropylene, polypropylene copolymer, polyethylene, polyethylene copolymer, polyamide, polyester, ABS, styrene terpolymer, and polyurethane.

The polyolefin layers and multilayer films as described herein may be exposed to various structure modifying treatments to further enhance aspects of physical performance. These products may, for example, be subjected to corona discharge treatment, ozone treatment, low temperature plasma treatment which incorporates either oxygen or nitrogen gas, glow plasma treatment, reverse sputtering treatment, oxidation treatment using chemicals, UV curing, e-beam irradiation, gamma beam irradiation, x-rays and the like. Such treatments may, among other things, cross-link the polymer structure of the polyolefin layers and the multilayer films. As an example, the multilayer films could be exposed to gamma beam, electron beam, or x-ray radiation at dosing levels of between 0.1 and 50 meg-rads. These treatments can improve the surface hardness, scratch resistance, mar resistance, chemical resistance and/or oxygen/air barrier efficiency of the multilayer structures while maintaining low haze, high gloss, transparency, and distinction of image. Additionally, weathering performance can be maintained or enhanced and material memory can be maintained. These treatments may also improve the adhesion properties of the tape structures 10, 30 to various substrates.

The improvements realized in the multilayer structures described herein in both design and durability performance allow them to be used in a variety of markets which require a "Class A" finish, such as:
Motor Vehicles
Light/Consumer Automotive
Heavy Trucks
RV
Agriculture
ATV's
Motorcycles
Snowmobiles
Jet Skis
Marine
Farm Machinery
Signage
Appliances
Consumer Electronics.

Example articles the multilayer sheets could be formed into include:
Bumper fascias
Rocker panels
Cell-Phone covers
Computer housings
Motor covers
Fenders
Heavy truck fairings
Running boards
RV wall panels
Appliance housings.

Figure 6:
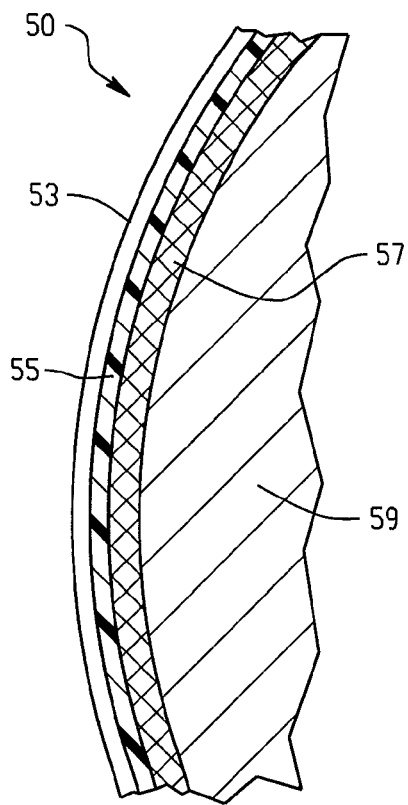
FIG. 6 is a cross-sectional view of an example vehicle body panel.
Figure 7:
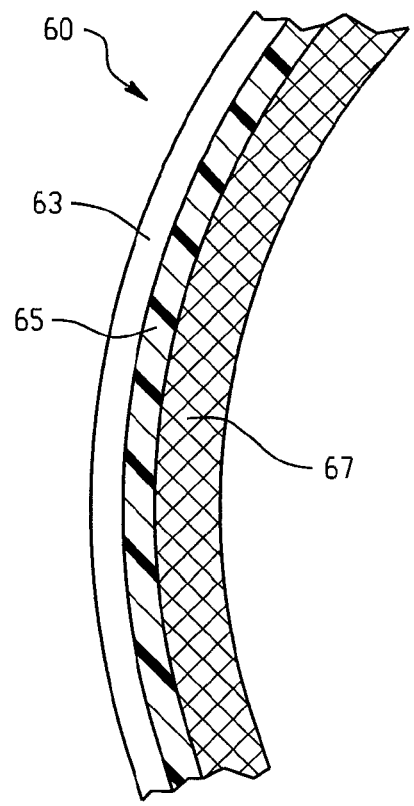
FIG. 7 is a cross-sectional view of a second example vehicle body panel.

FIGS. 6 and 7 show example cross-sections of vehicle body panels constructed of the multilayer structure of the present disclosure. In FIG. 6, the multilayer film has a clear layer 53, a color layer 55, and a backing layer 57, and the multilayer film is laminated onto a rigid substrate 59. In FIG. 7, the multilayer structure 60 has a clear layer 63, a color layer 65, and a backing layer 67. The multilayer structure 60 is thick and rigid enough to be a vehicle body panel without an additional rigid substrate. The translucent layer discussed above may also be used in combination with or in place of the colored layer on vehicle body panels. Also, the colored backing layer may be used in place of the backing layer and with only a clear layer on top in vehicle body panels.

In an additional example, the structures 1, 10, 20, 30 in FIGS. 1-4 and structures 40, 50, and 60 in FIGS. 5-7 utilize regrind as an additional layer adjacent to the backing layer or as a component of the backing layer. As explained below, the example backing layer provides significant and unexpected advantages over backing layers that mix regrind and virgin polymer in one layer.

Thermoforming TPO sheet is typically difficult due to the material's inherently weak melt strength. Inadequate melt strength during heating results in excessive "sheet sag," which in turn can cause various defects during forming of the part. Defects include excessive "webbing" in tight corners, surface "tears" in areas of high stretch, and non-uniform wall thickness. Significant variation in wall thickness throughout a part can cause excessive warping and/or reduced physical properties.

During sheet production, the melt strength of TPO is further compromised due to the addition of regrind which causes an increase in the severity of the above mentioned defects. The addition of regrind is performed in order to control costs by minimizing waste and reducing the overall raw material cost of the final part. Although the economics improve with the addition of regrind, the melt strength, sag resistance, and other properties of the sheet are significantly reduced.

It was unexpectedly discovered that the reduction of melt strength and sag resistance due to the addition of regrind can be significantly reduced by changing the structure of the TPO sheet.

Figure 8:
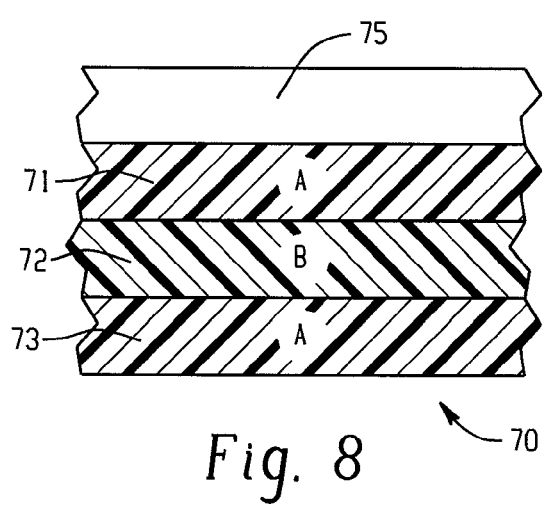
FIG. 8 is a cross-sectional view of an example multi-layer structure with an ABA backing layer.
Figure 9:
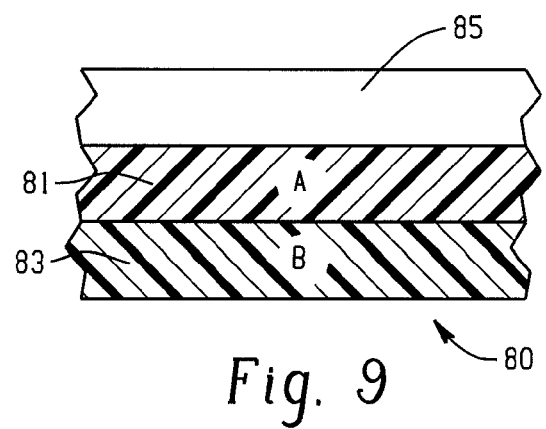
FIG. 9 is a cross-sectional view of an example multi-layer structure with an AB backing layer.

As shown in FIGS. 8 and 9 the thermoplastic polyolefin backing layer has multiple layers as components. There is a separate layer of virgin thermoplastic polyolefin material (Layer A) and a separate layer of regrind thermoplastic polyolefin material (Layer B). FIG. 8 shows an example sheet structure 70 with an ABA multilayered backing layer structure and FIG. 9 shows an example sheet structure 80 with an AB backing layer structure 80.

The example sheet structure 70 in FIG. 8 has an ABA backing layer made up of a first A layer 71, a second A layer 73, and a B layer 72 disposed between the first and second A layers 71, 73. First A layer 71 is adjacent to one side of the B layer 72 and the second A layer 73 is adjacent to the opposite side of the B layer 72. The ABA backing layer is combined with an upper section 75 that comprises a clear layer and optionally a translucent and/or color layer, as those layers are described above and are depicted in structures 1, 10, 20, 30, 40, 50, 60 shown in FIGS. 1-7. The first A layer 71 is adjacent to the upper section 75.

The polymeric base for first A layer 71 and the second A layer 73 of the example sheet structure 70 of FIG. 8 is 100% virgin thermoplastic polyolefin. Virgin thermoplastic means a thermoplastic that has not been reprocessed and/or previously used in another product. The thermoplastic polyolefin may be selected from the thermoplastic polyolefins described above for the backing layer 7 of FIG. 1. Additives may also be included as described herein for the backing layer.

The first A layer 71 is, for example, 5% to 45% of the total thickness of the ABA backing layer, such as 10 to 35%, 5 to 20%, or 25 to 45% of the total backing layer thickness. The entire example ABA backing layer structure is 3.0 to 500 mils, so the first A layer 71 may be 0.15 mils to 225 mils, such as 5 to 10 mils, 10-80 mils, or 20 to 150 mils. The second A layer 73 has the same range of thicknesses, however, its thickness is independently selected from the thickness of the first A layer 71.

The polymeric base for the B layer 72 is 100% regrind polyolefin material (meaning a polyolefin that has been previously used and/or reprocessed). If desired for certain applications, the B layer 72 may also be a mixture of regrind and virgin polymeric material. For example, the polymeric base for the B layer may comprise 10 to 99% regrind, such as 10 to 49%, 51 to 99%, or 25 to 75% regrind material, whereas the remainder of the polymeric base is virgin polyolefin material.

The regrind material is produced from sources such as trim scrap, products that do not meet quality control or specifications, or various other sources that would otherwise be waste materials. The original polymer used in the regrind material may, for example, be selected from the thermoplastic polyolefins described above for the backing layer 7 of FIG. 1. The original material used for the regrind material may also include additives as described herein for the backing layer. In one example, the regrind material is miscellaneous polypropylene homopolymers and copolymers with talc filler, colorants, and stabilizers.

The B layer 72 is, for example, 10-90% of the total thickness of the ABA backing layer, such as 10 to 49%, 51 to 90%, or 20 to 60% of the total backing layer thickness. The entire example ABA backing layer structure is 3.0 to 500 mils, so the B layer 72 may be 0.3 mils to 450 mils, such as 5 to 20 mils, 20-120 mils, or 40 to 300 mils.

In an alternate example, the first A layer 71 and optionally the second A layer 73 also include a pigment to supply the layer with a desired color. This colored backing layer is particularly suitable for use with an upper section 75 that includes only a clear layer. This can be considered a two-layer structure as described above and shown in FIG. 5, although the backing layer is divided into three separate layers.

The example sheet structure 80 shown in FIG. 9 has an AB backing layer made up of an A layer 81 and a B layer 83. The AB backing layer is combined with an upper section 85 that comprises a clear layer and optionally a translucent and/or color layer, as those layers are described above, and are depicted in structures 1, 10, 20, 30, 40, 50, 60 shown in FIGS. 1-7. The A layer 81 is adjacent to the B layer 83 on one side and is adjacent to the upper section 85 on the other side.

The A layer 81 and B layer 83 are composed of the same materials as disclosed for the ABA layer example shown in FIG. 8. Coloring may also be added to the A layer 81 as described above, particularly when the AB backing layer is used in conjunction with just a clear layer in the upper section 85.

The A layer 81 is, for example, 10-90% of the total thickness of the AB backing layer, such as 20-60%, 10 to 49%, or 51-90% of the total backing layer thickness. The entire example AB backing layer structure is 3.0 to 500 mils, so the A layer 81 may be 0.3 mils to 450 mils, such as 5 to 20 mils, 20-120 mils, or 40 to 300 mils.

The B layer 83 is, for example, 10-90% of the total thickness of the AB backing layer, such as 20-60%, 10 to 49%, or 51-90% of the total backing layer thickness. The entire example AB backing layer structure is 3.0 to 500 mils, so the B layer 83 may be 0.3 mils to 450 mils, such as 5 to 20 mils, 20-120 mils, or 40 to 300 mils.

The ABA and AB backing layers may be formed by coextrusion. The ABA and AB backing layers can be coextruded with the upper section that includes a clear layer and optionally a color and/or translucent layer. In another example, further thermoplastic polyolefin layers may be added. For example, the backing layer may be structured as an ABABA layered structure.

The example sheet structure 70, 80 may also be used in conjunction with upper sections 75, 85 that comprise chemistries other than the polyolefin layers described above. For example, the upper sections 75, 85 may comprise polymeric components such as acrylic, ionomer, fluoroacrylic, fluoropolymers, cast-fluoroacrylic, polystyrene, polyethylene, polycarbonate, acrylic styrene acrylonitrile (ASA), or mixtures thereof. These alternative upper section chemistries could also be extruded or laminated onto the ABA backing layer. In certain embodiments the upper sections 75, 85 could even be paint.

EXAMPLES 1-6

Example 1 is a prospective, generic example, and is set forth to demonstrate an example range of different ingredients that may be added to each layer of the multilayer structure. The optimal concentration and presence of these ingredients will vary based on the color and type of pigment desired. Other application specific parameters may also affect the composition of the multilayer structure.

Prospective Generic Example 1

Clear Layer
70-100% Inspire 404 Clear PP*
0-3.0% UV Stabilizer e.g. Cyasorb THT 7001
0-10.0% Slip Agent e.g. Crodamide ER (an effective amount that does not impact haze detrimentally)
0-3% Clarifier, e.g. NX20
0-1.0% Antioxidant, e.g. Hostanox Pep-Q
0-1.0% Second Antioxidant, e.g. Irganox 3114
Translucent Color Layer (this Layer is Optional & the Formula Varies with Color & Special Effects)
60.000-99.000% Polypropylene, e.g. Inspire 404 PP*
0-1.0% Antioxidant, e.g. Hostanox Pep-Q
0-3% Clarifier, e.g. NX20
>0-10.000% pigment &/or special effects
00.000-20.000% Color carrier 1 e.g. LLDPE purchased from Lancer Dispersions
00.000-20.000% Color carrier 2, e.g. Ethylene Acid Copolymer
00.000-20.000% Color carrier 3, e.g. AC540 Wax
00.000-20.000% Color carrier 4, e.g. Inspire 404 PP
00.000-3.00% UV Stabilizer, e.g. Cyasorb THT 7001
0-1.0% Antioxidant, e.g. Irganox 3114
Color Layer (this Formula Varies with Color & Special Effects)
50.000-95.000% Polypropylene, e.g. Inspire 404 PP*
0-3% Clarifier, e.g. NX20
0-1.0% Antioxidant, e.g. Hostanox Pep-Q
>0-20.000% Pigment &/or special effects
00.000-25.000% Color carrier 1, e.g. LLDPE
00.000-25.000% Color carrier 2, e.g. Ethylene Acid Copolymer
00.000-25.000% Color carrier 3, e.g. AC540 Wax
00.000-25.000% Color carrier 4, e.g. Inspire 404 PP
00.000-3.00% UV Stabilizer, e.g. Cyasorb THT 7001
0-1.0% Second antioxidant, e.g. Irganox 3114
Backing Layer
40-95% Polypropylene, e.g. Pro-Fax 7823 PP**
0-60% Rubber, e.g. DFDB 1088NT VLDPE
0-40% Talc Filler, e.g. Premium HTP Ultra 5 L
0-2% Process aid and dispersing aid, e.g. TR016 Wax
0-3% UV stabilizer, e.g. Chimassorb 119
0-2% Second process aid and dispersing aid, e.g. Synpro 12B Calcium Stearate
0-1% Antioxidant, e.g. Irganox 3114
0-1% Second Antioxidant, e.g. Hostanox Pep-Q
0-1% Third Antioxidant, e.g. Vanox ZMTI
0-0.5% Nucleator, e.g. HPN 20E
0-8.000% Pigment or Color Concentrate (A. Schulman)
Examples 2-6 are actual, non-generic examples, optimized for certain pigments.

EXAMPLE 2

Three-Layer Structure

Clear Layer
96.1% Inspire 404 Clear PP*
00.3% Cyasorb THT 7001 (UV stabilizer)
00.3% Crodamide ER (slip agent)
3% NX20 (Milliken Chemical) (clarifier)
0.300% Hostanox Pep-Q (antioxidant)
Color Layer
90.280% Inspire 404 PP*
3% NX20 (clarifier)
4.000% AC540 Wax (organic pigment carrier)
0.360% TC-110 EMA (inorganic pigment carrier)
0.040% Red Iron Oxide 116M (Nubiola) (pigment)
0.720% Perylene Red 179 229-8436 (Sun Chemical) (pigment)

1.000% DPP Red 254 Cromophtal 2030 (Ciba) (pigment)
0.300% Cyasorb THT 7001 (UV Stabilizer)
0.300% Hostanox Pep-Q (antioxidant)
Backing Layer
61.944% Pro-Fax 7823 PP**
7.680% DFDB 1088NT VLDPE (Dow Chemical)
24.48% Premium HTP Ultra 5 L talc filler (Imi Fabi)
0.576% TR016 Wax (process aid & dispersing aid)
0.288% Chimassorb 119 (UV stabilizer)
0.048% Synpro 12B Calcium Stearate (process aid & dispersing aid)
0.288% Irganox 3114 (antioxidant)
0.288% Hostanox Pep-Q (antioxidant)
0.288% Vanox ZMTI (antioxidant)
0.120% HPN 20E (Milliken Chemical) (nucleator)
4.000% Schulman Gray Color Concentrate (A. Schulman)

EXAMPLE 3

Four-Layer Structure

Clear Layer
99.1% Inspire 404 Clear PP*
00.3% Cyasorb THT 7001 (UV stabilizer)
00.3% Crodamide ER (slip agent)
00.3% Hostanox Pep-Q (antioxidant)
Translucent Color Layer
98.700% Inspire 404 PP*
0.490% AC540 Wax (organic pigment carrier)
0.210% DPP Red 254 Cromophtal 2030 (pigment)
0.300% Cyasorb THT 7001 (UV Stabilizer)
0.300% Hostanox Pep-Q (antioxidant)
Color Layer
79.400% Inspire 404 PP*
14.000% R104TiO2 (pigment) (DuPont)
4.796% HB9200 propylene homopolymer (Ineos USA LLC) (pigment carrier)
1.204% Profax 6301 polypropylene (Lyondell Bassell) (pigment carrier)
0.300% Cyasorb THT 7001 (UV Stabilizer)
0.300% Hostanox Pep-Q (antioxidant)
Backing Layer
61.944% Pro-Fax 7823 PP**
7.680% DFDB 1088NT VLDPE
24.48% Premium HTP Ultra 5 L (talc filler)
0.576% TR016 Wax (process aid & dispersing aid)
0.288% Chimassorb 119 (UV stabilizer)
0.048% Synpro 12B Calcium Stearate (process aid & dispersing aid)
0.288% Irganox 3114 (antioxidant)
0.288% Hostanox Pep-Q (antioxidant)
0.288% Vanox ZMTI (antioxidant)
0.120% HPN 20E (nucleator)
4.000% Schulman Gray Color Concentrate (A. Schulman)

EXAMPLE 4

Four-Layer Structure

Clear Layer
96.1% Inspire 404 Clear PP*
3% NX20 (clarifier)
00.3% Cyasorb THT 7001 (UV Stabilizer)
00.3% Crodamide ER (Slip Agent)
0.30% Hostanox Pep-Q (antioxidant)
Translucent Color Layer
94.400% Inspire 404 PP*
3% NX20 (clarifier)
1.120% AC540 Wax (organic pigment carrier)
0.480% PR177 (DIC) (pigment)
0.240% Primacor 1410 (pigment carrier)
0.160% 9320J Hi-Lite Sparkle Orange (BASF) (special effects pigment)
0.300% Cyasorb THT 7001 (UV Stabilizer)
0.300% Hostanox (antioxidant)
Color Layer
93.450% Inspire 404 PP*
3% NX20 (clarifier)
0.875% AC540 Wax (organic pigment carrier)
0.375% BP1300 (Cabot) (carbon black) (pigment black #7)
2.000% Silver ET-2025 Aluminum Flake (Silberline)
0.300% Cyasorb THT 7001 (UV Stabilizer)
0.300% Hostanox Pep-Q (antioxidant)
Backing Layer
61.944% Pro-Fax 7823 PP**
7.680% DFDB 1088NT VLDPE
24.48% Premium HTP Ultra 5 L (talc filler)
0.576% TR016 Wax (process aid & dispersing aid)
0.288% Chimassorb 119 (UV stabilizer)
0.048% Synpro 12B Calcium Stearate (process aid & dispersing aid)
0.288% Irganox 3114 (antioxidant)
0.288% Hostanox Pep-Q (antioxidant)
0.288% Vanox ZMTI (antioxidant)
0.120% HPN 20E (nucleator)
4.000% Schulman Gray Color Concentrate (A. Schulman)

EXAMPLE 5

Three-Layer Structure

Clear Layer
96.900% Pristene RM2091***
1.000% Hostavin PR-31 (Clariant)
0.150% Hostavin VSU (Clariant)
0.300% Hostanox Pep-Q (antioxidant)
0.300% Irgastab FS-042 (Ciba)
0.350% Tinuvin 328 (Ciba)
1.000% Crodamide ER (slip agent)
Color Layer
90.780% Pristene RM2091***
4.000% AC540 Wax (organic pigment carrier)
0.360% LLDPE (Lancer Dispersions) (inorganic pigment carrier)
0.040% Red Iron Oxide 116M (inorganic pigment)
0.720% Perylene Red 179 229-8436 (organic pigment)
1.000% DPP Red 254 CROMOPHTAL 2030 (organic pigment)
1.000% Hostavin PR-31 (Clariant) (UV additive)
0.150% Hostavin VSU (Clariant) (UV additive)
0.300% Hostanox Pep-Q (antioxidant)
0.300% Irgastab FS-042 (Ciba) (antioxidant)
0.350% Tinuvin 328 (Ciba) (UV additive)
1.000% Crodamide ER (slip agent)
Backing Layer
58.704% Pro-fax 7823 PP**
11.520% DBDB 1088 NT VLDPE (Dow)
24.480% Premium HTP Ultra 5 L Talc (filler)
0.048% Calcium Stearate Synpro 12B
0.518% Irganox 3114 (antioxidant)
0.346% Doverphos F9228 (antioxidant) (Dover Chemical Corp.)
0.288% Chimasorb 119 (UV stabilizer)

0.096% Tinuvin 328 (Ciba) (UV additive)
4.000% Schulman Gray Color Concentrate (A. Schulman)

EXAMPLE 6

Two-Layer Structure with Colored TPO

Clear Layer
90% Inspire 404 PP*
6.9% RM2091 (LyondellBasell)
1.000% Hostavin PR-31 (UV additive)
0.150% Hostavin VSU (UV additive)
0.300% Hostanox Pep-Q (antioxidant)
0.350% Tinuvin 328 (UV additive)
1.000% Crodamide ER (slip agent)
Colored TPO Layer
62.123% Profax PP7823**
7.640% DFDB 1088 NT VLDPE
24.352% Hi Talc Premium HTP Ultra 5 L
0.048% Synpro 12B calcium stearate (process aid & dispersing aid)
0.516% Irganox 3114 (antioxidant)
0.344% Hostanox Pep-Q (antioxidant)
0.382% Tinuvin XT850 (Ciba) (UV additive)
03095% Tinuvin 328 (UV additive)
4.500% Schulman PX-1657 Ford White P Color Concentrate (A. Schulman) (All Percentages are by Weight.)
*Inspire 404 PP is a highly isotactic, highly crystalline polypropylene/ethylene copolymer containing about 1-7% ethylene monomers, and having a flexural modulus of 2070 MPa (⅛ inch bar), 156° C. melting point, 95.6 J/g enthalpy of melting, Rockwell C hardness)
**Pro-Fax 7823 PP is a polypropylene/ethylene copolymer, Rockwell 80R scale, flexural modulus of 1120 MPa by ASTM D790, melting point greater than 120° C.
***Pristene RM2091 is an metallocene based isotactic polypropylene/ethylene copolymer, melting point 130° C., flexural modulus 1000 MPa by ISO 178.
Process for Example 2
  Clear Layer
  First, an additive concentrate was made by feeding the UV stabilizer and slip agent along with about 2.4% by weight (based upon the total weight of the clear layer) of the INSPIRE 404 polypropylene copolymer to a twin screw extruder. The INSPIRE 404 polypropylene copolymer acts as a carrier resin in this stage of the process. The extruded product is a pelletized additive concentrate.
  The clear layer was then fabricated by feeding the remaining approximately 93.7% of the INSPIRE 404 polypropylene copolymer to a single screw extruder along with the additive concentrate, the clarifier, and the antioxidant. The additive concentrate makes up 3% of the total weight of the clear layer.
  Color Layer
  An additive concentrate was made for the color layer, just as described above for the clear layer, except no slip agent is present.
  Additionally, a first color concentrate was made by combining water, the organic pigments (Perylene Red 179 229-8436 and DPP Red 254 Cromophtal 2030) and organic pigment carrier (AC540 Wax). The water is displaced by the addition of the organic pigment carrier during a flushing process, as described in U.S. patent publication 2005/0282962, which is herein incorporated by reference. A second color concentrate was made by adding the inorganic pigment and inorganic carrier resin to a mill.
  The color layer was then fabricated by feeding the INSPIRE 404 polypropylene copolymer to a single screw extruder along with the additive concentrate and the first and second color concentrates.
  Backing Layer
  In a separate process, a Farrell Continuous Mixer was loaded with Pro-Fax 7823 polypropylene and the DFDB 1088NT very low density polyethylene. Talc and the other additives listed in the formula for Example 2 were added also. The product of the mixer was natural TPO in pellet form.
  The color concentrate pellets and the natural TPO pellets were then added to a single screw extruder, which produced the backing layer.
  Coextrusion Setup
  The single screw extruders for the clear, color, and backing layers were positioned so that each layer would be coextruded in a multilayer stack.
Process for Example 3
  Clear Layer
  The clear layer was made by the process described above in Example 2, but with the formula for Example 3.
  Translucent Layer
  The color concentrate was made by the same process used to make the color layer as described in Example 2, but with the pigment and carrier resin given in the formula above for Example 3.
  The translucent layer was then fabricated by feeding the INSPIRE 404 polypropylene copolymer to a single screw extruder along with the color concentrate, the antioxidant, and the UV additive.
  Color Layer
  The color layer was fabricated by feeding the INSPIRE 404 polypropylene copolymer to a single screw extruder along with the two carrier resins and one pigment, the antioxidant, and the UV additive.
  Backing Layer
  The backing layer was made by the process described above in Example 2.
  Coextrusion Setup
  The single screw extruders for the clear, translucent, color, and backing layers were positioned so that each layer would be coextruded in a multilayer stack.
Process for Example 4
  Clear Layer
  The clear layer was made by the process described above in Example 2, but with the formula for Example 4.
  Translucent Layer
  The translucent layer was made by the same process used to make the translucent layer as described in Example 3, but with the formula for Example 4.
  Color Layer
  An additive concentrate was made for the color layer, just as described above for the clear layer, except no slip agent is present.
  Additionally, a color concentrate was made by combining water, the carbon black pigment BP1300 and organic pigment carrier (AC540 Wax). The water is displaced by the addition of the organic pigment carrier during the flushing process, as described in U.S. patent publication 2005/0282962.
  The color layer was then fabricated by feeding the INSPIRE 404 polypropylene copolymer to a single screw extruder along with the additive concentrate, the color concentrate, and the aluminum flake.
  Backing Layer
  The backing layer was made by the process described above in Example 2.

Coextrusion Setup

The single screw extruders for the clear, translucent, color, and backing layers were positioned so that each layer would be coextruded in a multilayer stack.

Process for Example 5

Clear Layer

First, an additive concentrate was made by feeding the UV stabilizer, antioxidant, and slip agent along with about 6.9% by weight (based upon the total weight of the clear layer) of the INSPIRE 404 polypropylene copolymer to a twin screw extruder. The INSPIRE 404 polypropylene copolymer acts as a carrier resin in this stage of the process. The extruded product is a pelletized additive concentrate.

The clear layer was then fabricated by feeding the remaining approximately 90% of the INSPIRE 404 polypropylene copolymer to a single screw extruder along with the additive concentrate. The additive concentrate makes up about 10% of the total weight of the clear layer.

Color Layer

An additive concentrate was made for the color layer, just as described above for the clear layer of Example 5.

Additionally, a first color concentrate was made by combining water, the organic pigments (Perylene Red 179 229-8436 and DPP Red 254 Cromophtal 2030) and organic pigment carrier (AC540 Wax). The water is displaced by the addition of the organic pigment carrier during a flushing process, as described in U.S. patent publication 2005/0282962.

A second color concentrate was made by adding the inorganic pigment and inorganic carrier resin (LLDPE) to a mill.

The color layer was then fabricated by feeding the INSPIRE 404 polypropylene copolymer to a single screw extruder along with additive concentrate and the first and second color concentrates in the amounts shown in the formula above.

Backing Layer

In a separate process, a Farrell Continuous Mixer was loaded with Pro-Fax 7823 polypropylene and the DFDB 1088NT very low density polyethylene. Talc and the other additives listed in the formula for Example 5 were added also. The product of the mixer was natural TPO in pellet form.

The color concentrate pellets and the natural TPO pellets were then added to a single screw extruder, which produced the backing layer.

Coextrusion Setup

The single screw extruders for the clear, color, and backing layers were positioned so that each layer would be coextruded in a multilayer stack.

Process for Example 6

Clear Layer

The clear layer was made by the process described above in Example 2, but with the formula for Example 6.

Colored Backing Layer

The colored backing layer was made by the process described above in Example 2, but with the formula for Example 6.

Coextrusion Setup

The single screw extruders for the clear and colored backing layers were positioned so that each layer would be coextruded in a multilayer stack.

Results

Table 1 summarizes the advantages over competitive technologies in terms of design simplification, design flexibility, process flexibility, & environmental friendliness. Table 2 shows that the multilayer sheets in olefinic Examples 2-6 display the best overall durability performance in comparison to competitive designs. The comparative example of a polyolefin material with block copolymer base and no slip additive is prospective based on known polypropylene examples with no additives.

TABLE 1

|  | Olefinic Examples 2-6 | Ionomer | Acrylic/ABS | Solvent Cast | Painted Plastic | Painted Metal |
|---|---|---|---|---|---|---|
| Paint Free/Recyclable | Yes | Yes | Yes | No | No | No |
| No Adhesive Between Color & Backing Layers | Yes | No | Yes | No | No | No |
| Can Be Laminated or Directly Formed | Yes | Yes | No | No | No | No |
| Can Be Used as a Tape Product | Yes | Yes | No | Yes | No | No |
| Can Coextrude the Entire Structure from Thin to Thick Sheet With No Change in Tooling | Yes | Yes | Yes | No | No | No |
| Color retention vs. percent elongation (1.0 delta E max @ 60%) | Pass | Pass | Pass | Fail | Fail | Fail |

TABLE 2

| Test | Standard | Pass/Fail Criteria | Olefinic Examples 2-6 | Prospective Comparative Example Olefin w/block copolymer base and no slip additive | Ionomer | Acrylic/ABS or Acrylic/ASA or PC/ASA or PC | Solvent Cast Fluoro-Acrylic | Painted Plastic | Painted Metal |
|---|---|---|---|---|---|---|---|---|---|
| Imprint Resistance @ 70° C. | Honda #16 | No Imprint, No Adhesion | Pass | Pass | Fail | Pass | Pass | Pass | Pass |
| Oil Resistance @ 70° C. | GM9533P | Compare to Control | Pass (8-10) | Pass | Fail (4) | Pass (10) | Pass (10) | Pass (8) | Pass (8) |

TABLE 2-continued

| Test | Standard | Pass/Fail Criteria | Olefinic Examples 2-6 | Prospective Comparative Example Olefin w/block copolymer base and no slip additive | Ionomer | Acrylic/ ABS or Acrylic/ ASA or PC/ASA or PC | Solvent Cast Fluoro- Acrylic | Painted Plastic | Painted Metal |
|---|---|---|---|---|---|---|---|---|---|
| Grease Resistance @ 70° C. | GM9533P | Compare to Control | Pass (8-10) | Pass | Fail (4) | Pass (10) | Pass (10) | Fail (6) | Fail (6) |
| Egg Albumin Resistance @ 70° C. | GM9533P | Compare to Control | Pass (10) | Pass | Fail (4) | Pass (10) | Fail (6-8) | Pass (8) | Fail (6) |
| Methanol Resistance @ RT | GM9509P | 1 maximum | Pass | Pass | Pass | Pass | Pass | Pass | Pass |
| Scratch & Mar Resistance | GMW3943 | Compare to Control | Pass | Fail | Pass | Fail | Pass | Pass | Pass |
| Gravelometer | GM9508P 5 pints/ 90° Impact angle/ −30° C. | 7 or greater | 9 | Fail | 9 | Fails (cracks) | <7 | <7 | <7 |
| Gravelometer | GM9508P 10 pints/ 30° degree impact angle/ −30° C. | 7 or greater | 9 | Fail | 7 but failed due to delamination | Fails (cracks) | <7 | <7 | <7 |
| Low Temp Impact | GM 9904P GMP.E/P.148 | All ductile failures @ −30° C. | Pass | Pass | Pass | Fail shatters | Fail | Fail | Pass |
| Crock Mar | CLP 463 PB-54 | Compare to Control | Pass | Fail | Fail | Fail | Pass | Pass | Pass |

GM9533P Scale: 10 = no change, 8 = Slight, 6 = Moderate, 4 = Pronounced, 2 = Severe
GM9509P Scale: 0 = no change, 1 = Slight, 3 = Moderate, 5 = Severe
GM9508P Scale: 0 = Fail, 1 = Poor −, 2 = Poor, 3 = Poor +, 4 = Fair −, 5 = Fair, 6 = Fair +, 7 = Good −, 8 = Good, 9 = Good +, 10 = no damage/no chipping
GMW3943 Scale: 1 = no scratch, 2, 3, 4, 5 = Worst
The test standards used above are available from General Motors, Honda, and Chrysler. Testing was performed by Ghesquire Plastic Testing, Inc. of Harper Woods, MI and A. Schulman Invision of Sharon Center, OH.

In summary, the favorable results for the example olefinic multilayer structures shown in both tables were made without sacrificing the high gloss and DOI requirements that are needed in order to achieve a Class "A" surface.

EXAMPLES 1A-8A

Figure 10:
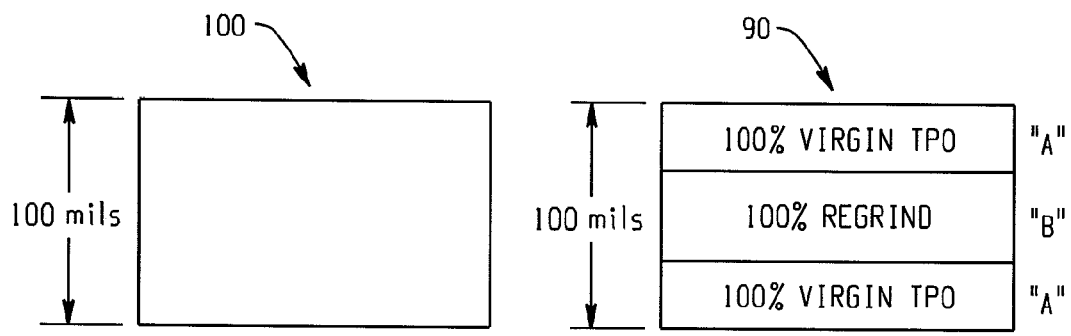
FIG. 10 is a cross-sectional view of a mono-layer virgin/regrind blended backing layer and an ABA backing layer.

Examples 1A-8A illustrate the unexpected results obtained by using a multi-layered virgin/regrind/virgin backing layer instead of a blended regrind and virgin monolayer backing layer. FIG. 10 shows an ABA backing layer 90 that corresponds to Examples 1A-4A. FIG. 10 also shows a monolayer backing layer 100 that corresponds to Examples 5A-8A. Both structures 90, 100 were 100 mils in thickness in all the Examples 1A-8A.

Example 1A is a control showing a single A layer that is not blended with regrind.

In Examples 2A-4A, the A layers are coextruded with the B layer adjacent to them. The A layer is composed of the materials as specified in Table 3. Percentages are given in weight percents. Though fillers, colorants, stabilizers and other additives are present, the polymeric base is 100% virgin polymer. The B layer is composed of regrind miscellaneous polypropylene homo- and copolymers with talc, filler, colorants, and stabilizers. The polymeric base of the B layer is 100% regrind polymer. Examples 1A-4A vary in the thickness of the A layers and the B layers. In Examples 2A-4A the two A layers in each Example are of equal thicknesses, in values of 40 mil, 30 mil, and 20 mil, respectively.

In Examples 5A-7A regrind is blended with the virgin polymer and other additives in the amounts disclosed in Table 4. Example 8A is a control using 100% regrind. The same type of regrind material was used in Examples 5A-8A as was used in Examples 2A-4A. The structure in Examples 5A-8A is a single-layer extruded sheet.

TABLE 3

| Example | 1A | 2A | 3A | 4A |
|---|---|---|---|---|
| A/B/A Layer Thicknesses | | | | |
| Total A Layer thickness (mils) | 100 | 80.0 | 60.0 | 40.0 |
| B Layer thickness (mils) | 0.00 | 20.0 | 40.0 | 60.0 |
| A Layer Composition | | | | |
| Pro-Fax 7823 PP (%) | 64.301 | 64.301 | 64.301 | 64.301 |
| DFDB 1088 NT VLDPE (%) | 7.920 | 7.920 | 7.920 | 7.920 |
| Premium HTP Ultra 5L (talc filler) (%) | 25.245 | 25.245 | 25.245 | 25.245 |
| TR016 wax (process aid & dispersing aid) (%) | 0.594 | 0.594 | 0.594 | 0.594 |
| Chimassorb 119 (UV stabilizer) (%) | 0.297 | 0.297 | 0.297 | 0.297 |

TABLE 3-continued

| Example | 1A | 2A | 3A | 4A |
|---|---|---|---|---|
| Synpro 12B Calcium Stearate (process aid & dispersing aid) (%) | 0.049 | 0.049 | 0.049 | 0.049 |
| Evanstab 18 DSTDP (Evans Chemetics) (antioxidant) | 0.198 | 0.198 | 0.198 | 0.198 |
| Irganox B225 (CIBA) (antioxidant) (%) | 0.396 | 0.396 | 0.396 | 0.396 |
| Polyblak 3123B (A. Schulman) (black color concentrate) (%) | 1.000 | 1.000 | 1.000 | 1.000 |

TABLE 4

| Example | 5A | 6A | 7A | 8A |
|---|---|---|---|---|
| Total Mono Layer thickness (mils) | 100 | 100 | 100 | 100 |
| Mono-Layer Composition | | | | |
| Pro-Fax 7823 PP (%) | 51.440 | 38.580 | 25.720 | 0.000 |
| DFDB 1088 NT VLDPE (%) | 6.336 | 4.752 | 3.168 | 0.000 |
| Premium HTP Ultra 5L (talc filler) (%) | 20.196 | 15.147 | 10.098 | 0.000 |
| TR016 wax (process aid & dispersing aid)(%) | 0.475 | 0.356 | 0.238 | 0.000 |
| Chimassorb 119 (UV stabilizer)(%) | 0.238 | 0.178 | 0.119 | 0.000 |
| Synpro 12B Calcium Stearate (process aid & dispersing aid)(%) | 0.040 | 0.030 | 0.020 | 0.000 |
| Evanstab 18 DSTDP (antioxidant) | 0.158 | 0.119 | 0.079 | 0.000 |
| Irganox B225 (antioxidant)(%) | 0.317 | 0.238 | 0.158 | 0.000 |
| Polyblak 3123B (black color concentrate)(%) | 1.000 | 1.000 | 1.000 | 1.000 |
| Regrind(%) | 19.800 | 39.600 | 59.400 | 99.000 |

The A layers of Examples 1A-4A were made by the following process. The Pro-Fax 7823 polypropylene and the DFDB 1088NT very low density polyethylene were fed into a Farrell Continuous Mixer. Talc and the other additives listed in Tables 3 were also added. The product of the mixer was natural TPO in pellet form. In the next step, pelletized black color concentrate and the natural TPO pellets were added to a single screw extruder.

The mono-layer Example 1A was the product of extruding the A layer as a mono-layer sheet.

The B layers of Examples 2A-4A were made by feeding pelletized and ground up regrind to a single screw extruder.

In Examples 2A-4A, the extruders were positioned so that each layer would be coextruded in a multilayer stack.

In Examples 5A-7A Pro-Fax 7823 polypropylene and the DFDB 1088NT very low density polyethylene were fed to a Farrell Continuous Mixer. Talc and the other additives listed in Table 4 were also added. The product of the mixer was a virgin TPO in pellet form. In the next step, pelletized black color concentrate, the virgin TPO pellets, and regrind were added to a single screw extruder and extruded as a mono-layer sheet.

Example 8A was made by the same process as Examples 4A-7A, except no virgin polymer "Pro-Fax 7823 polypropylene" was added.

Results

Figure 11:
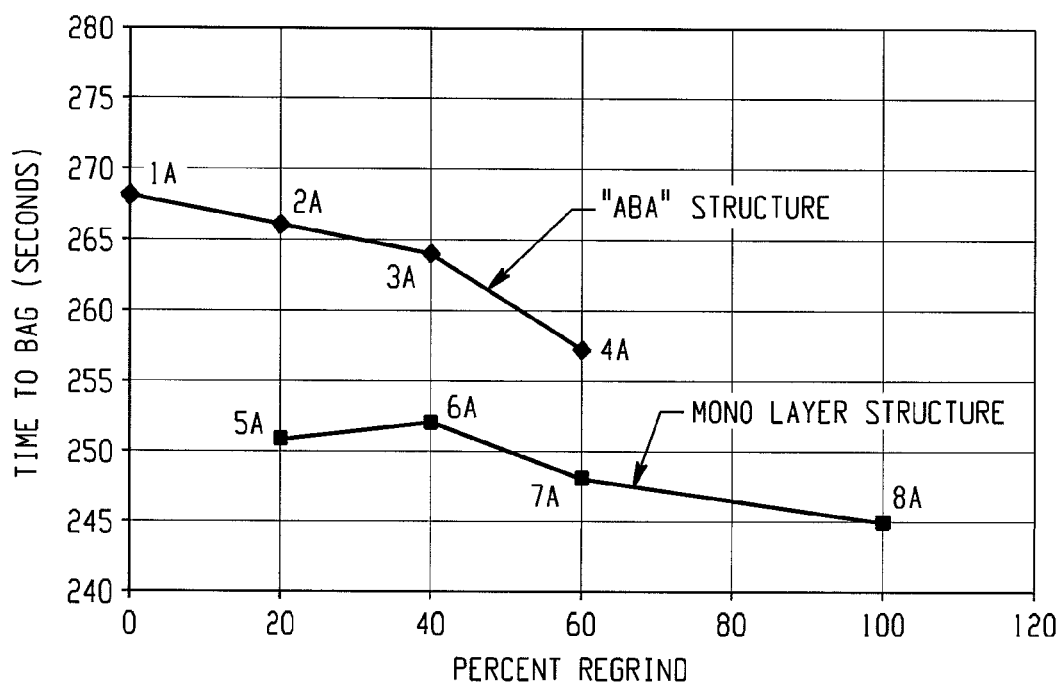
FIG. 11 is a graph comparing the "bag time" of a monolayer virgin/regrind blended backing layer and an ABA backing layer.

FIG. 11 compares the virgin backing layer of Example 1 and the virgin/regrind/virgin ABA structured backing layers of Examples 2A-4A to the mono-layer structured backing layers of Examples 5A-8A. In particular, FIG. 11 shows the impact of varying amounts of regrind on sag resistance for each type of structure. In these Examples, sag resistance was measured in terms of "bag time," which is the amount of time required to reach a bag depth of seven inches after heating of the sheet is initiated. The sheet sample size was 40 inches by 20 inches. The sample was heated at 340° F. on a thermoformer. As the data shows, the "bag time" decreases (decreasing sag resistance) as the % regrind increases in both sets of Examples. However, Examples 2A to 4A show improved sag resistance versus Examples 5A to 7A. For example, improvements of 3.5% or greater in terms of time to bag, such as 5% and greater are exhibited by Examples 2A to 4A over Examples 5A to 7A.

In addition, other properties of the ABA structured backing layer show unexpected improvement compared to the blended mono-layer structure. Table 5 summarizes the results of additional testing performed on Examples 1A-8A. The columns are offset so that Examples that are directly comparative in terms of regrind percentage are in vertical alignment.

TABLE 5

| Example | 1A | 2A | 3A | 4A |
|---|---|---|---|---|
| Flex Mod (MPa) | 2520 | 2612 | 2559 | 2391 |
| % Elong @ Break | 327 | 311 | 251 | 199 |
| Tensile @ Yield (Mpa) | 19 | 19.3 | 19.8 | 21 |
| Ductile/Brittle Pt (° C.) | −20 | −20 | −20 | −10 |
| Energy to Max Load (J) | 29 | 29 | 31 | 29 |
| Total Energy (J) | 49 | 49 | 51 | 49 |

| Example | 5A | 6A | 7A | 8A |
|---|---|---|---|---|
| Flex Mod (MPa) | 2474 | 2278 | 2030 | 1278 |
| % Elong @ Break | 325 | 251 | 264 | 33 |
| Tensile @ Yield (Mpa) | 19 | 19 | 20 | 19 |
| Ductile/Brittle Pt (° C.) | −10 | −10 | −10 | brittle @ 0 |
| Energy to Max Load (J) | 30 | 30 | 31 | 3 |
| Total Energy (J) | 51 | 49 | 51 | 4 |

The flexural modulus was tested according ISO 178 at 2 mm/min and a 64 mm span. The elongation at break and tensile at yield parameters were tested according to ISO 527 at 50 mm/min. The ductile/brittle point, energy to Max Load, and total energy measurements were tested according to GM9904P at 2.2 m/s. For the flexural modulus, percent elongation at break, and tensile at yield tests, the samples were cut parallel to the direction of the extrusion flow.

This written description sets forth the best mode of the invention, and describes the invention so as to enable a person skilled in the art to make and use the invention, by presenting examples. The patentable scope of the invention is defined by the claims, and may include other examples that occur to those skilled in the art.

The invention claimed is:

1. A multilayer structure comprising:
    a clear polyolefin layer;
    a colored polyolefin layer;
    a polyolefin backing layer;
    the colored and backing layers are coextruded and are permanently bonded at a layer interface;
    the interface is exclusive of an adhesive layer;
    the structure has a DOI of 70 or greater; and
    the structure passes a gravelometer impact test per the GM9508P standard, with a 10 pt load, at a −30° C. temperature, and at an angle of 30 degrees.

2. The multilayer structure of claim 1, wherein the clear polyolefin layer is 2.5 to 20 mils in thickness and the colored polyolefin layer is 3 to 20 mils thick.

3. The multilayer structure of claim 1, wherein the clear polyolefin and the colored polyolefin layers comprise polypropylene/ethylene copolymer or a metallocene-based homopolymer or copolymer of propylene, and the backing layer comprises a polyolefin and an elastomeric material.

4. The multilayer structure of claim 1, wherein the structure has a gloss of 75 or greater at a 60° angle and a gloss of 60 or greater at a 20° angle.

5. The multilayer structure of claim 1, wherein the polyolefin backing layer comprises, a polyolefin, a filler, and an elastomer.

6. The multilayer structure of claim 1, wherein the clear and color polyolefin layers comprise a polypropylene/ethylene copolymer.

7. The multilayer structure of claim 1, further comprising a mask layer that adheres to the polymer layer during thermoforming.

8. The multilayer structure of claim 1, wherein the structure has a DOI of 85 or greater.

9. The multilayer structure of claim 1, wherein the structure passes a five-finger scratch and mar resistance test defined by GMW 3943.

10. The multilayer structure of claim 1, wherein the structure exhibits no gauze imprint at 70° C. minimum under a 500 g load applied over a 40 mm diameter for two hours.

11. The multilayer structure of claim 1, wherein the structure shows no signs of gloss loss, staining, or surface swelling at 70° C. with exposure to methanol, motor oil, lithium grease, and egg albumin.

12. The multilayer structure of claim 1, wherein the structure has a flexural modulus from 1000 to 7000 MPa.

13. The multilayer structure of claim 1, wherein the backing layer is a thermoplastic polyolefin comprising a polypropylene/ethylene copolymer and polyethylene or ethylene copolymer rubber, wherein the polyethylene or ethylene copolymer rubber has a density of 0.75 to 0.95 g/cm$^3$.

14. The multilayer structure of claim 1, wherein the structure further comprises a second coextruded color layer permanently bonded to the color layer, wherein the color layer is translucent and the second color layer is opaque.

15. The multilayer structure of claim 1, wherein pigment is added to the color layer in a pigment pre-dispersion, and the pigment pre-dispersion when melted will flow through a U.S. Mesh 400 screen.

16. The multilayer structure of claim 1, wherein the polyolefin of the clear layer has a Rockwell hardness of 80R or greater.

17. The multilayer structure of claim 2, wherein the backing layer is 3 to 500 mils in thickness.

18. The multilayer structure of claim 2, wherein the clear polyolefin layer has a haze of 10 or less.

19. The multilayer structure of claim 3, wherein an ethylene monomer is 1-7% of the monomer units of the polypropylene/ethylene copolymers.

20. A coextruded formed product comprising:
a clear polyolefin layer;
a colored polyolefin layer;
a polyolefin backing layer;
the colored and backing layers are coextruded and are permanently bonded at a layer interface;
the interface is exclusive of an adhesive layer;
the formed product has a DOI of 70 or greater; and
the formed product passes a gravelometer impact test per the GM9508P standard, with a 10 pt load, at a −30° C. temperature, and at an angle of 30 degrees.

21. The formed product of claim 20, wherein the clear polyolefin layer is 2.5 to 20 mils in thickness and the colored polyolefin layer is 3 to 20 mils thick.

22. The formed product of claim 20, wherein the clear polyolefin and the colored polyolefin layers comprise polypropylene/ethylene copolymer or a metallocene-based homopolymer or copolymer of propylene, and the backing layer comprises a polyolefin and an elastomeric material.

23. The formed product of claim 20, wherein the product has a gloss of 75 or greater at a 60° angle and a gloss of 60 or greater at a 20° angle.

24. The formed product of claim 20, wherein the polyolefin backing layer comprises, a polyolefin, a filler, and an elastomer.

25. The formed product of claim 20, wherein the clear and color polyolefin layers comprise a polypropylene/ethylene copolymer.

26. The formed product of claim 20, further comprising a mask layer that adheres to the polymer layer during thermoforming.

27. The formed product of claim 20, wherein the product has a DOI of 85 or greater.

28. The formed product of claim 20, wherein the product passes a five-finger scratch and mar resistance test defined by GMW 3943.

29. The formed product of claim 20, wherein the product exhibits no gauze imprint at 70° C. minimum under a 500 g load applied over a 40 mm diameter for two hours.

30. The formed product of claim 20, wherein the structure shows no signs of gloss loss, staining, or surface swelling at 70° C. with exposure to methanol, motor oil, lithium grease, and egg albumin.

31. The formed product of claim 20, wherein the structure has a flexural modulus from 1000 to 7000 MPa.

32. The formed product of claim 20, wherein the backing layer is a thermoplastic polyolefin comprising a polypropylene/ethylene copolymer and polyethylene or ethylene copolymer rubber, wherein the polyethylene or ethylene copolymer rubber has a density of 0.75 to 0.95 g/cm$^3$.

33. The formed product of claim 20, wherein the structure further comprises a second coextruded color layer permanently bonded to the color layer, wherein the color layer is translucent and the second color layer is opaque.

34. The formed product of claim 20, wherein pigment is added to the color layer in a pigment pre-dispersion, and the pigment pre-dispersion when melted will flow through a U.S. Mesh 400 screen.

35. The formed product of claim 21, wherein the backing layer is 3 to 500 mils in thickness.

36. The formed product of claim 21, wherein the clear polyolefin layer has a haze of 10 or less.

37. The formed product of claim 21, wherein the polyolefin of the clear layer has a Rockwell hardness of 80R or greater.

38. The formed product of claim 22, wherein an ethylene monomer is 1-7% of the monomer units of the polypropylene/ethylene copolymers.

39. A multilayer structure comprising:
a polyolefin layer;
a thermoplastic polyolefin backing layer;
the polyolefin and backing layers are coextruded and are permanently bonded at a layer interface;
the interface is exclusive of an adhesive layer;
the structure has a DOI of 70 or greater; and
the structure passes a gravelometer impact test per the GM9508P standard, with a 10 pt load, at a −30° C. temperature, and at an angle of 30 degrees.

40. The multilayer structure of claim 39, wherein the polyolefin layer is 2.5 to 20 mils in thickness.

41. The multilayer structure of claim 39, wherein the polyolefin layer comprises polypropylene/ethylene copolymer or a metallocene-based homopolymer or copolymer of propylene, and the backing layer comprises a polyolefin and an elastomeric material.

42. The multilayer structure of claim 39, wherein the structure has a gloss of 75 or greater at a 60° angle and a gloss of 60 or greater at a 20° angle.

43. The multilayer structure of claim 39, wherein the polyolefin layer has a haze of 10 or less.

44. The multilayer structure of claim 39, wherein the polyolefin backing layer comprises, a polyolefin, a filler, and an elastomer.

45. The multilayer structure of claim 39, further comprising a mask layer that adheres to the polymer layer during thermoforming.

46. The multilayer structure of claim 39, wherein the structure has a DOI of 85 or greater.

47. The multilayer structure of claim 39, wherein the structure passes a five-finger scratch and mar resistance test defined by GMW 3943.

48. The multilayer structure of claim 39, wherein the structure exhibits no gauze imprint at 70° C. minimum under a 500 g load applied over a 40 mm diameter for two hours.

49. The multilayer structure of claim 39, wherein the structure shows no signs of gloss loss, staining, or surface swelling at 70° C. with exposure to methanol, motor oil, lithium grease, and egg albumin.

50. The multilayer structure of claim 39, wherein the structure has a flexural modulus from 1000 to 7000 MPa.

51. The multilayer structure of claim 39, wherein the backing layer is a thermoplastic polyolefin comprising a polypropylene/ethylene copolymer and polyethylene or ethylene copolymer rubber, wherein the polyethylene or ethylene copolymer rubber has a density of 0.75 to 0.95 g/cm$^3$.

52. The multilayer structure of claim 39, wherein the polyolefin of the polyolefin layer has a Rockwell hardness of 80R or greater.

53. The multilayer structure of claim 40, wherein the backing layer is 3 to 500 mils in thickness.

54. The multilayer structure of claim 41, wherein an ethylene monomer is 1-7% of the monomer units of the polypropylene/ethylene copolymers.

55. A formed product comprising:
a polyolefin layer;
a thermoplastic polyolefin backing layer;
the polyolefin and backing layers are coextruded and are permanently bonded at a layer interface;
the interface is exclusive of an adhesive layer;
the formed product has a DOI of 70 or greater; and
the formed product passes a gravelometer impact test per the GM9508P standard, with a 10 pt load, at a −30° C. temperature, and at an angle of 30 degrees.

56. The formed product of claim 55, wherein the polyolefin layer is 2.5 to 20 mils in thickness.

57. The formed product of claim 55, wherein the polyolefin layer comprises polypropylene/ethylene copolymer or a metallocene-based homopolymer or copolymer of propylene, and the backing layer comprises a polyolefin and an elastomeric material.

58. The formed product of claim 55, wherein the polyolefin layer has a haze of 10 or less.

59. The formed product of claim 55, wherein the polyolefin backing layer comprises, a polyolefin, a filler, and an elastomer.

60. The formed product of claim 55, wherein the polyolefin layers comprise a polypropylene/ethylene copolymer.

61. The formed product of claim 55, further comprising a mask layer that adheres to the polymer layer during thermoforming.

62. The formed product of claim 55, wherein the product has a DOI of 85 or greater.

63. The formed product of claim 55, wherein the product passes a five-finger scratch and mar resistance test defined by GMW 3943.

64. The formed product of claim 55, wherein the product exhibits no gauze imprint at 70° C. minimum under a 500 g load applied over a 40 mm diameter for two hours.

65. The formed product of claim 55, wherein the product shows no signs of gloss loss, staining, or surface swelling at 70° C. with exposure to methanol, motor oil, lithium grease, and egg albumin.

66. The formed product of claim 55, wherein the product has a flexural modulus from 1000 to 7000 MPa.

67. The formed product of claim 55, wherein the backing layer is a thermoplastic polyolefin comprising a polypropylene/ethylene copolymer and polyethylene or ethylene copolymer rubber, wherein the polyethylene or ethylene copolymer rubber has a density of 0.75 to 0.95 g/cm$^3$.

68. The formed product of claim 55, wherein the polyolefin of the polyolefin layer has a Rockwell hardness of 80R or greater.

69. The formed product of claim 56, wherein the backing layer is 3 to 500 mils in thickness.

70. The formed product of claim 56, wherein the product has a gloss of 75 or greater at a 60° angle and a gloss of 60 or greater at a 20° angle.

71. The formed product of claim 57, wherein an ethylene monomer is 1-7% of the monomer units of the polypropylene/ethylene copolymers.

72. A method of making a formed product comprising:
coextruding a clear polyolefin layer, a colored polyolefin layer, or both a clear polyolefin layer and a colored polyolefin layer, together with a polyolefin backing layer to form a multi-layer structure;
wherein each coextruded layer is permanently bonded at a layer interface, and the interface is exclusive of an adhesive layer;
thermoforming the multi-layer structure to make a formed product;
wherein the formed product has the characteristics of at least one of:
(A) a DOI of 70 or greater; and the product passes a gravelometer impact test per the GM9508P standard, with a 10 pt load, at a −30° C. temperature, and at an angle of 30 degrees; and
(B) the polyolefin of a top layer selected from the clear and the color layer, has a Rockwell hardness of 80R or greater; and the structure has a gloss of 75 or greater at a 60° angle and a gloss of 60 or greater at a 20° angle.

73. The method of claim 72, further comprising the step of adding pigment to form a pigment pre-dispersion in the colored polyolefin layer.

74. The method of claim 72, wherein the pigment pre-dispersion, when melted, will flow through a U.S. Mesh 400 screen.

75. The method of claim 72, wherein the clear and color polyolefin layer comprise polypropylene/ethylene copolymer or a metallocene-based homopolymer or copolymer of propylene, and the backing layer comprises a polypropylene/ethylene copolymer or a metallocene-based homopolymer or copolymer of propylene and an elastomeric material.

76. The method of claim 72, further comprising adding a mask layer that adheres to the clear polyolefin layer during thermoforming.

77. A method of making a multilayer structure comprising:
coextruding a clear polyolefin layer, a colored polyolefin layer, or both a clear polyolefin layer and colored polyolefin layer, together with a polyolefin backing layer, to form a multi-layer structure;
wherein each coextruded layer is permanently bonded at a layer interface, and the interface is exclusive of an adhesive layer;
wherein the multilayer structure has the characteristics of at least one of:
(A) a DOI of 70 or greater; and the multilayer structure passes a gravelometer impact test per the GM9508P standard, with a 10 pt load, at a –30° C. temperature, and at an angle of 30 degrees; and
(B) the polyolefin of a top layer selected from the clear and the color layer, has a Rockwell hardness of 80R or greater; and the structure has a gloss of 75 or greater at a 60° angle and a gloss of 60 or greater at a 20° angle.

78. The method of claim 77, further comprising the step of adding pigment to form a pigment pre-dispersion in the colored polyolefin layer.

79. The method of claim 77, wherein the clear and color polyolefin layer comprise polypropylene/ethylene copolymer or a metallocene-based homopolymer or copolymer of propylene, and the backing layer comprises a polypropylene/ethylene copolymer or a metallocene-based homopolymer or copolymer of propylene and an elastomeric material.

80. The method of claim 77, further comprising adding a mask layer that adheres to the polymer layer during thermoforming.

81. The method of claim 78, wherein the pigment pre-dispersion, when melted, will flow through a U.S. Mesh 400 screen.

82. A multilayer structure comprising:
a clear polyolefin layer, wherein the polyolefin is a polypropylene/ethylene copolymer or a metallocene-based homopolymer or copolymer of propylene;
a colored polyolefin layer wherein the polyolefin is a polypropylene/ethylene copolymer, a metallocene-based homopolymer or copolymer of propylene;
a polyolefin backing layer, wherein the polyolefin is a polypropylene/ethylene copolymer or a metallocene-based homopolymer or copolymer of propylene and an elastomeric material;
the colored and backing layers are coextruded and are permanently bonded at a layer interface; and
the interface is exclusive of an adhesive layer;
wherein the polyolefin of the clear layer has a Rockwell hardness of 80R or greater;
wherein the structure has a gloss of 75 or greater at a 60° angle and a gloss of 60 or greater at a 20° angle.

83. The multilayer structure of claim 82, wherein the clear polyolefin layer is 2.5 to 20 mils in thickness and the colored polyolefin layer is 3 to 20 mils thick.

84. The multilayer structure of claim 82, wherein the clear polyolefin and the colored polyolefin layers comprise polypropylene/ethylene copolymer or a metallocene-based homopolymer or copolymer of propylene, and the backing layer comprises a polyolefin and an elastomeric material.

85. The multilayer structure of claim 82, wherein the polyolefin backing layer comprises, a polyolefin, a filler, and an elastomer.

86. The multilayer structure of claim 82, wherein the clear and color polyolefin layers comprise a polypropylene/ethylene copolymer.

87. The multilayer structure of claim 82, further comprising a mask layer that adheres to the polymer layer during thermoforming.

88. The multilayer structure of claim 82, wherein the structure has a DOI of 85 or greater.

89. The multilayer structure of claim 82, wherein the structure passes a five-finger scratch and mar resistance test defined by GMW 3943.

90. The multilayer structure of claim 82, wherein the structure exhibits no gauze imprint at 70° C. minimum under a 500 g load applied over a 40 mm diameter for two hours.

91. The multilayer structure of claim 82, wherein the structure shows no signs of gloss loss, staining, or surface swelling at 70° C. with exposure to methanol, motor oil, lithium grease, and egg albumin.

92. The multilayer structure of claim 82, wherein the structure has a flexural modulus from 1000 to 7000 MPa.

93. The multilayer structure of claim 82, wherein the backing layer is a thermoplastic polyolefin comprising a polypropylene/ethylene copolymer and polyethylene or ethylene copolymer rubber, wherein the polyethylene or ethylene copolymer rubber has a density of 0.75 to 0.95 g/cm$^3$.

94. The multilayer structure of claim 82, wherein the structure further comprises a second coextruded color layer permanently bonded to the color layer, wherein the color layer is translucent and the second color layer is opaque.

95. The multilayer structure of claim 82, wherein pigment is added to the color layer in a pigment pre-dispersion, and the pigment pre-dispersion when melted will flow through a U.S. Mesh 400 screen.

96. The multilayer structure of claim 82, wherein the structure passes a gravelometer impact test per the GM9508P standard, with a 10 pint load, at a –30° C. temperature, and at an impact angle of 30 degrees.

97. The multilayer structure of claim 83, wherein the backing layer is 3 to 500 mils in thickness.

98. The multilayer structure of claim 83, wherein the clear polyolefin layer has a haze of 10 or less.

99. The multilayer structure of claim 84, wherein an ethylene monomer is 1-7% of the monomer units of the polypropylene/ethylene copolymers.

100. A formed product comprising:
a clear polyolefin layer, wherein the polyolefin is a polypropylene/ethylene copolymer or a metallocene-based homopolymer or copolymer of propylene;
a colored polyolefin layer wherein the polyolefin is a polypropylene/ethylene copolymer, a metallocene-based homopolymer or copolymer of propylene;
a polyolefin backing layer, wherein the polyolefin is a polypropylene/ethylene copolymer or a metallocene-based homopolymer or copolymer of propylene and an elastomeric material;
the colored and backing layers are coextruded and are permanently bonded at a layer interface; and
the interface is exclusive of an adhesive layer;
wherein the polyolefin of the clear layer has a Rockwell hardness of 80R or greater;
wherein the formed product has a gloss of 75 or greater at a 60° angle and a gloss of 60 or greater at a 20° angle.

101. The formed product of claim 100, wherein the clear polyolefin layer is 2.5 to 20 mils in thickness and the colored polyolefin layer is 3 to 20 mils thick.

102. The formed product of claim 100, wherein the clear polyolefin and the colored polyolefin layers comprise polypropylene/ethylene copolymer or a metallocene-based homopolymer or copolymer of propylene, and the backing layer comprises a polyolefin and an elastomeric material.

103. The formed product of claim 100, wherein the polyolefin backing layer comprises, a polyolefin, a filler, and an elastomer.

104. The formed product of claim 100, wherein the clear and color polyolefin layers comprise a polypropylene/ethylene copolymer.

105. The formed product of claim 100, further comprising a mask layer that adheres to the polymer layer during thermoforming.

106. The formed product of claim 100, wherein the product has a DOI of 85 or greater.

107. The formed product of claim 100, wherein the product passes a five-finger scratch and mar resistance test defined by GMW 3943.

108. The formed product of claim 100, wherein the product exhibits no gauze imprint at 70° C. minimum under a 500 g load applied over a 40 mm diameter for two hours.

109. The formed product of claim 100, wherein the structure shows no signs of gloss loss, staining, or surface swelling at 70° C. with exposure to methanol, motor oil, lithium grease, and egg albumin.

110. The formed product of claim 100, wherein the structure has a flexural modulus from 1000 to 7000 MPa.

111. The formed product of claim 100, wherein the backing layer is a thermoplastic polyolefin comprising a polypropylene/ethylene copolymer and polyethylene or ethylene copolymer rubber, wherein the polyethylene or ethylene copolymer rubber has a density of 0.75 to 0.95 $g/cm^3$.

112. The formed product of claim 100, wherein the structure further comprises a second coextruded color layer permanently bonded to the color layer, wherein the color layer is translucent and the second color layer is opaque.

113. The formed product of claim 100, wherein pigment is added to the color layer in a pigment pre-dispersion, and the pigment pre-dispersion when melted will flow through a U.S. Mesh 400 screen.

114. The formed product of claim 101, wherein the backing layer is 3 to 500 mils in thickness.

115. The formed product of claim 102, wherein an ethylene monomer is 1-7% of the monomer units of the polypropylene/ethylene copolymers.

116. The formed product of claim 115, wherein the clear polyolefin layer has a haze of 10 or less.

* * * * *

UNITED STATES PATENT AND TRADEMARK OFFICE
CERTIFICATE OF CORRECTION

PATENT NO.       : 8,182,906 C1
APPLICATION NO.  : 90/013513
DATED            : April 4, 2016
INVENTOR(S)      : Smith It is certified that error appears in the above-identified patent and that said Letters Patent is hereby corrected as shown below:

Title Page, Item (73) Assignee,
"JPMORGAN CHASE BANK, N.A., Chicago, IL (US)" should read as -- A. SCHULMAN, INC., Akron, OH (US) --.

Signed and Sealed this
Third Day of May, 2016

Michelle K. Lee
*Director of the United States Patent and Trademark Office*

(12) EX PARTE REEXAMINATION CERTIFICATE (10843rd)
United States Patent
Smith

(10) Number: US 8,182,906 C1
(45) Certificate Issued: *Apr. 4, 2016

(54) MULTILAYER CLEAR OVER COLOR POLYOLEFIN SHEETS AND LAYERED BACKING STRUCTURE

(75) Inventor: Dennis C. Smith, Norwalk, OH (US)

(73) Assignee: JPMORGAN CHASE BANK, N.A., Chicago, IL (US)

Reexamination Request:
No. 90/013,513, May 26, 2015
No. 90/013,611, Oct. 21, 2015

Reexamination Certificate for:
Patent No.: 8,182,906
Issued: May 22, 2012
Appl. No.: 13/219,270
Filed: Aug. 26, 2011

(*) Notice: This patent is subject to a terminal disclaimer.

Related U.S. Application Data

(63) Continuation of application No. 12/548,946, filed on Aug. 27, 2009, now Pat. No. 8,007,902, which is a continuation of application No. PCT/US2009/042704, filed on May 4, 2009.

(60) Provisional application No. 61/050,465, filed on May 5, 2008.

(51) Int. Cl.
| | |
|---|---|
| B32B 7/02 | (2006.01) |
| B32B 3/00 | (2006.01) |
| B32B 27/08 | (2006.01) |
| B32B 5/00 | (2006.01) |
| B29C 47/06 | (2006.01) |
| B32B 27/20 | (2006.01) |
| B32B 27/32 | (2006.01) |
| B29C 47/00 | (2006.01) |
| C08J 5/18 | (2006.01) |
| B60R 13/02 | (2006.01) |
| C08K 5/20 | (2006.01) |
| C08K 5/053 | (2006.01) |
| B29K 23/00 | (2006.01) |
| B29C 47/04 | (2006.01) |
| B29C 51/14 | (2006.01) |
| B29C 51/00 | (2006.01) |
| B29K 509/00 | (2006.01) |

(52) U.S. Cl.
CPC ............ *B32B 27/20* (2013.01); *B29C 47/0004* (2013.01); *B32B 27/08* (2013.01); *B32B 27/32* (2013.01); *B32B 27/327* (2013.01); *B60R 13/02* (2013.01); *C08J 5/18* (2013.01); *C08K 5/053* (2013.01); *C08K 5/20* (2013.01); *B29C 47/0021* (2013.01); *B29C 47/043* (2013.01); *B29C 47/065* (2013.01); *B29C 51/002* (2013.01); *B29C 51/14* (2013.01); *B29K 2023/00* (2013.01); *B29K 2509/00* (2013.01); *B32B 2250/03* (2013.01); *B32B 2250/24* (2013.01); *B32B 2250/40* (2013.01); *B32B 2270/00* (2013.01); *B32B 2272/00* (2013.01); *B32B 2274/00* (2013.01); *B32B 2307/4026* (2013.01); *B32B 2307/414* (2013.01); *B32B 2307/584* (2013.01); *B32B 2307/738* (2013.01); *B32B 2605/00* (2013.01); *C08J 2323/14* (2013.01); *C08J 2423/06* (2013.01); *Y10T 156/1002* (2015.01); *Y10T 428/24967* (2015.01); *Y10T 428/26* (2015.01); *Y10T 428/269* (2015.01); *Y10T 428/31913* (2015.04)

(58) Field of Classification Search
None
See application file for complete search history.

(56) References Cited

To view the complete listing of prior art documents cited during the proceedings for Reexamination Control Numbers 90/013,513 and 90/013,611, please refer to the USPTO's public Patent Application Information Retrieval (PAIR) system under the Display References tab.

*Primary Examiner* — Elizabeth McKane

(57) ABSTRACT

A multilayer structure includes a clear polyolefin layer, a colored polyolefin layer, and a random polyolefin backing layer. The colored and backing layers are coextruded and are permanently bonded at a layer interface, which is exclusive of an adhesive. The structure has a DOI of 70 or greater and passes a gravelometer impact test per the GM9508P standard, with a 10 pint load, at a –30° C. temperature, and at an impact angle of 30 degrees. Among other uses, the structures are appropriate for use as body panels in the motor vehicle industry. The structures display a "class A" finish and meet a variety of requirements for durability and weatherability. An ABA structured backing layer and a method of making it are also described herein.

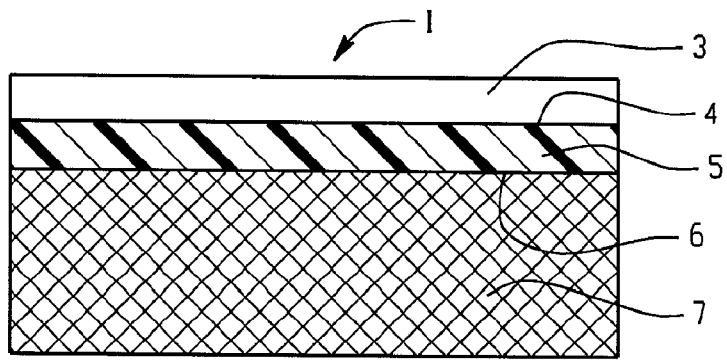

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-81 is confirmed.

Claims 82-116 were not reexamined.

\* \* \* \* \*